(12) United States Patent
Lee et al.

(10) Patent No.: US 9,767,571 B2
(45) Date of Patent: Sep. 19, 2017

(54) APPARATUS AND METHOD FOR ANALYZING IMAGE INCLUDING EVENT INFORMATION

(71) Applicant: SAMSUNG ELECTRONICS CO., LTD., Suwon-si (KR)

(72) Inventors: Jun Haeng Lee, Hwaseong-si (KR); Hyun Suk Ryu, Hwaseong-si (KR); Kyoobin Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/331,405

(22) Filed: Jul. 15, 2014

(65) Prior Publication Data

US 2015/0030204 A1    Jan. 29, 2015

(30) Foreign Application Priority Data

Jul. 29, 2013  (KR) .................. 10-2013-0089254
Aug. 20, 2013  (KR) .................. 10-2013-0098273

(51) Int. Cl.
*G06T 7/55* (2017.01)
*G06T 7/246* (2017.01)
*G06T 7/20* (2017.01)

(52) U.S. Cl.
CPC ............ *G06T 7/2033* (2013.01); *G06T 7/246* (2017.01); *G06T 7/55* (2017.01); *G06T 2207/10004* (2013.01)

(58) Field of Classification Search
None
See application file for complete search history.

(56) References Cited

U.S. PATENT DOCUMENTS

| | | | |
|---|---|---|---|
| 7,613,322 B2 * | 11/2009 | Yin ..................... | G06K 9/00771 348/143 |
| 7,728,269 B2 | 6/2010 | Lichtsteiner et al. | |
| 7,747,039 B2 * | 6/2010 | Fujimoto ........... | G06K 9/00362 340/435 |
| 8,286,102 B1 * | 10/2012 | Wilensky ............ | G06F 3/04845 715/782 |
| 9,143,680 B2 * | 9/2015 | Lee ..................... | H04N 5/23229 |
| 9,185,431 B2 * | 11/2015 | Asamura .............. | H04N 19/139 |
| 2006/0197664 A1 | 9/2006 | Zhang et al. | |

(Continued)

FOREIGN PATENT DOCUMENTS

| | | |
|---|---|---|
| EP | 2 767 889 A1 | 8/2014 |
| JP | 2006-072638 A | 3/2006 |

(Continued)

OTHER PUBLICATIONS

Communication dated Mar. 30, 2015 issued by the European Patent Office in counterpart European Patent Application No. 14178332.4.

(Continued)

*Primary Examiner* — Michelle Hausmann
(74) *Attorney, Agent, or Firm* — Sughrue Mion, PLLC

(57) ABSTRACT

An apparatus and method for analyzing an image including event information for determining a pattern of at least one pixel group corresponding to event information included in an input image, and analyzes at least one of an appearance of an object and a motion of the object, based on the at least one pattern.

17 Claims, 19 Drawing Sheets

(56) References Cited

U.S. PATENT DOCUMENTS

| | | | | |
|---|---|---|---|---|
| 2006/0262958 A1* | 11/2006 | Yin | .................... | G06K 9/00771 382/103 |
| 2007/0268369 A1* | 11/2007 | Amano | .................... | H04N 7/18 348/207.99 |
| 2009/0256848 A1* | 10/2009 | Iourcha | .................... | G06T 5/00 345/522 |
| 2010/0079413 A1* | 4/2010 | Kawashima | ........... | B60K 35/00 345/175 |
| 2010/0118199 A1* | 5/2010 | Kobayashi | ............ | H04N 5/607 348/578 |
| 2013/0335595 A1* | 12/2013 | Lee | .................... | H04N 5/23229 348/231.5 |

FOREIGN PATENT DOCUMENTS

| | | | |
|---|---|---|---|
| JP | 2010-117772 A | 5/2010 | |
| KR | 10-0762670 B1 | 10/2007 | |
| KR | 10-2012-0026956 A | 3/2012 | |
| SE | WO 2006037659 A1 * | 4/2006 | ............ H04W 36/32 |
| WO | 2013/055137 A1 | 4/2013 | |

OTHER PUBLICATIONS

Junhaeng Lee et al.; "Live Demonstration: Gesture-Based remote control using stereo pair of dynamic vision sensors"; IEEE International Symposium on Circuits and Systems; 2012; XP002729077; 6 pages total.

Jurgen Kogler et al.; "Event-Based Stereo Matching Approaches for Frameless Address Event Stereo Data"; Advances in Visual Computing; Sep. 26, 2011; XP019166064; pp. 674-685.

Gwo Giun Lee, et al., "A Motion-Adaptive Deinterlacer via Hybrid Motion Detection and Edge-Pattern Recognition", Hindawi Publishing Corporation, EURASIP Journal on Image and Video Processing, vol. 2008, Article ID 741290, total 10 pages, doi:10.1155/2008/741290.

Chi-Han Chuang, et al., "Fast Block Motion Estimation With Edge Alignment on H.264 Video Coding", Journal of Marine Science and Technology, vol. 18, No. 6, pp. 883-894 (2010).

Yui-Lam Chan, et al., "A Block Motion Vector Estimation Using Pattern Based, Pixel Decimation", 1997 IEEE International Symposium on Circuits and Systems, Jun. 9-12, 1997, Hong Kong, total 4 pages.

Communication dated Sep. 2, 2015 issued by European Patent Office in counterpart European Patent Application No. 14178332.4.

* cited by examiner

FIG. 2B

| n1  | n2  | n3  | n4  | n5  |
|-----|-----|-----|-----|-----|
| n6  | n7  | n8  | n9  | n10 |
| n11 | n12 |     | n13 | n14 |
| n15 | n16 | n17 | n18 | n19 |
| n20 | n21 | n22 | n23 | n24 |

FIG. 2C

| n1 | n2 | n3 | n4 | n5 | n6 | n7 |
|----|----|----|----|----|----|----|
| n8 | n9 | n10 | n11 | n12 | n13 | n14 |
| n15 | n16 | n17 | n18 | n19 | n20 | n21 |
| n22 | n23 | n24 |  | n25 | n26 | n27 |
| n28 | n29 | n30 | n31 | n32 | n33 | n34 |
| n35 | n36 | n37 | n38 | n39 | n40 | n41 |
| n42 | n43 | n44 | n45 | n46 | n47 | n48 |

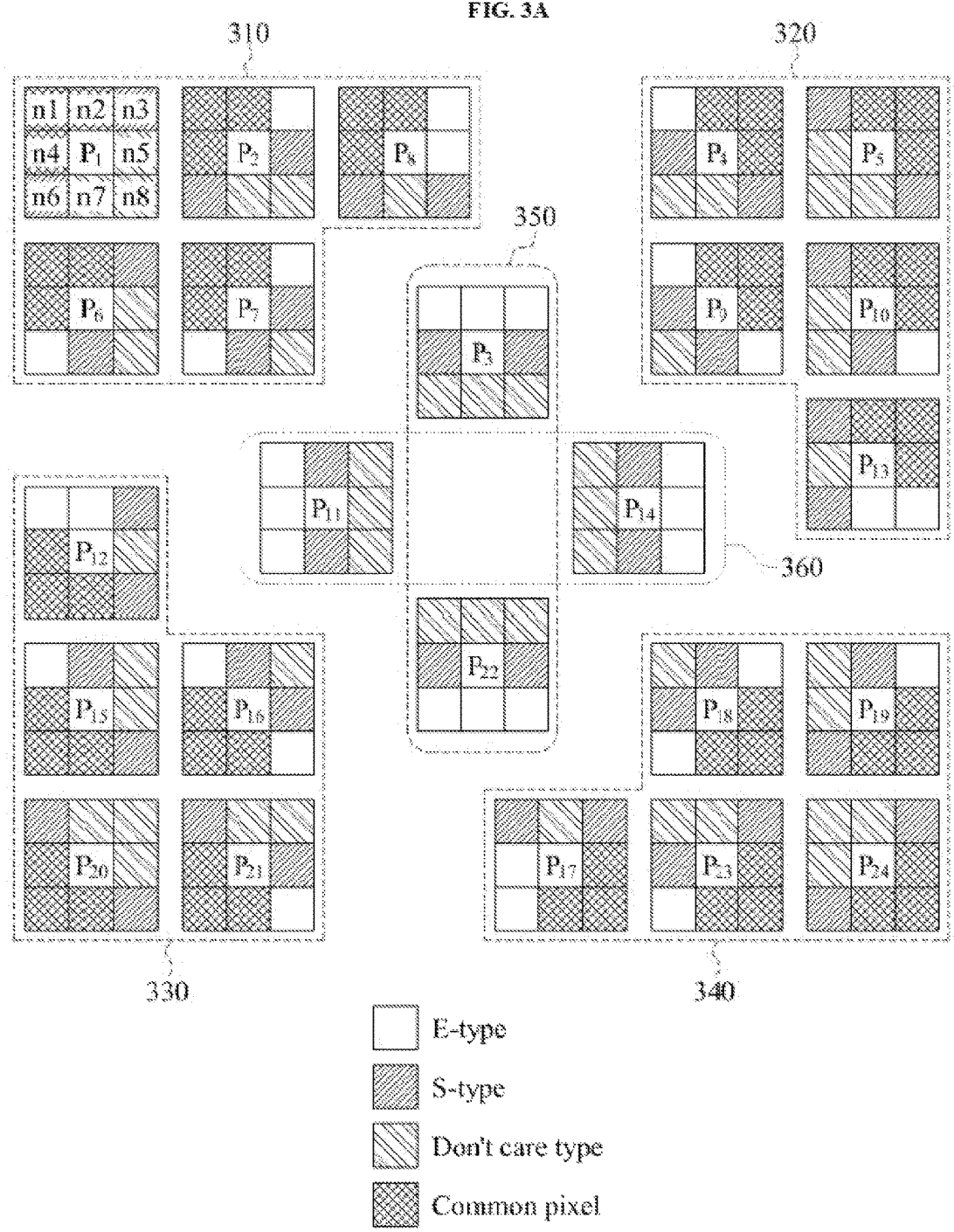

FIG. 3B

| $b_0$ | $b_1$ | $b_2$ |
|---|---|---|
| $b_7$ |  | $b_3$ |
| $b_6$ | $b_5$ | $b_4$ |

FIG. 8C

| Appearance | Actual V | Calculated V |
|---|---|---|
| ■ | ⇨ | ➡ |
| ♦ | ⇨ | ➡ |
| ◆ | ⇨ | ➡ |
| ⬧ | ⇨ | ➡ |

871, 872, 873

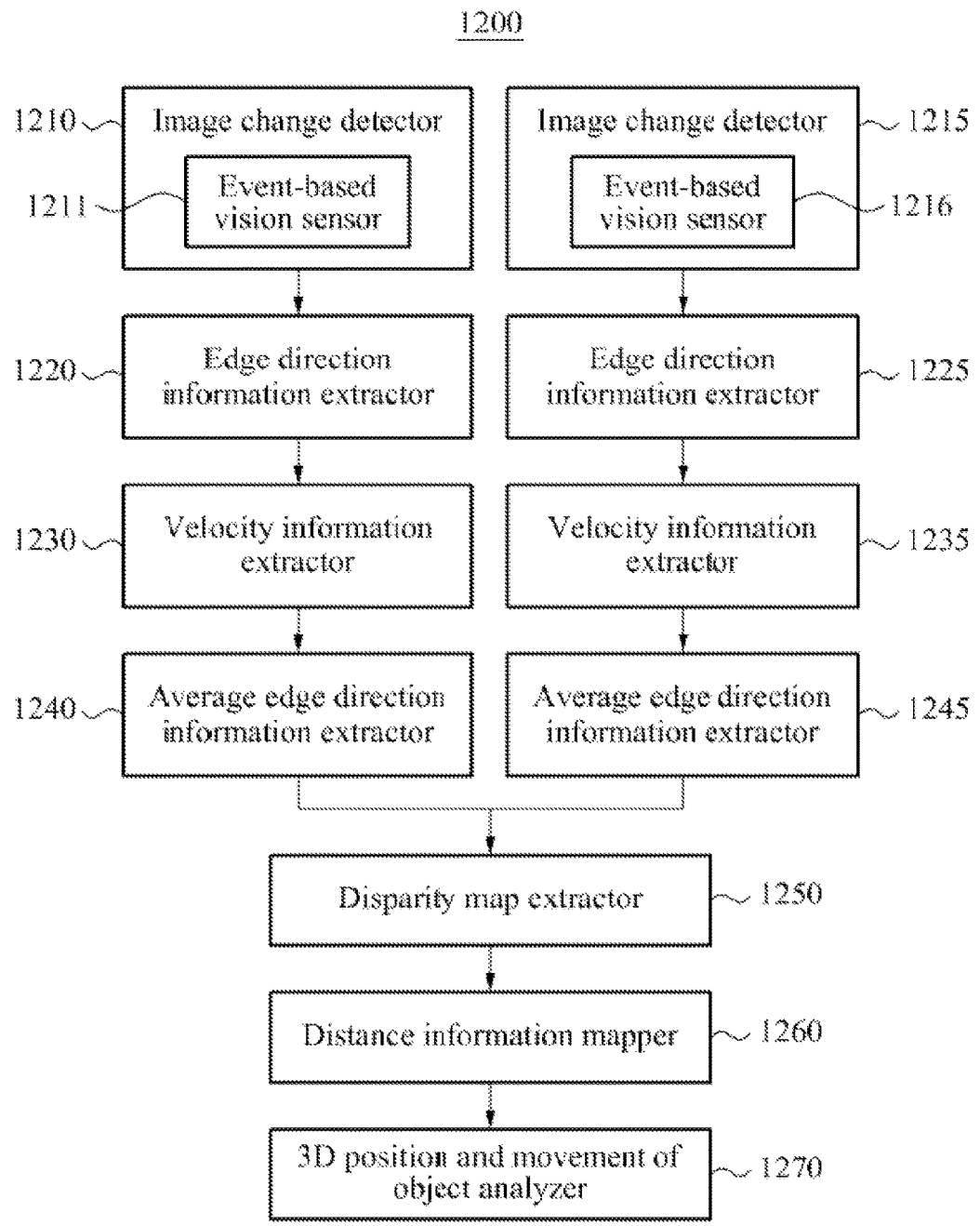

APPARATUS AND METHOD FOR ANALYZING IMAGE INCLUDING EVENT INFORMATION

CROSS-REFERENCE TO RELATED APPLICATIONS

This application claims priority from Korean Patent Application No. 10-2013-0089254, filed on Jul. 29, 2013, and Korean Patent Application No. 10-2013-0098273, filed on Aug. 20, 2013, in the Korean Intellectual Property Office, the disclosures of which are incorporated herein by reference in their entireties.

BACKGROUND

1. Field

Methods and apparatuses consistent with exemplary embodiments relate to an apparatus for analyzing an image, and more particularly, to a method and apparatus for analyzing an object included in an input image.

2. Description of the Related Art

Image processing may refer to all forms of information processing in which images are input and output, and for example, may include analyzing or processing a photo, a video, and the like.

A device for sensing input data for image processing may be a vision sensor, and, for example, may include a photoelectric transducer, which has become an integrated circuit, based on technology for manufacturing a semiconductor device, and the like.

SUMMARY

According to an aspect of an exemplary embodiment, there is provided an apparatus for analyzing an image, the apparatus including a classifier configured to receive an event signal corresponding to at least one pixel of an event-based vision sensor, and configured to determine a pattern of a pixel group of a plurality of pixels of the event-based vision sensor including the at least one pixel and a plurality of adjacent pixels of the event-based vision sensor adjacent to the at least one pixel, and an analyzer configured to determine at least one of an appearance of the object and movement of the object, based on the pattern of the pixel group.

The classifier may determine whether the pixel group corresponds to at least one edge pattern among a plurality of predetermined edge patterns.

The analyzer may include a calculator to calculate a velocity corresponding to the pixel group, based on the pattern of the pixel group, and a motion analyzer configured to analyze the movement of the object, based on the velocity corresponding to the pixel group.

The apparatus for analyzing the image may further include a processor configured to calculate an amount of variation of a relative coordinate of a point for a user input, based on the movement of the object, and process a user input, based on the amount of variation of the relative coordinate.

According to an aspect of an exemplary embodiment, there is provided an apparatus for analyzing an image, the apparatus including a classifier configured to receive a first event signal corresponding to a first pixel of an event-based vision sensor and a second event signal corresponding to a second pixel of the event-based vision sensor, determine a first pattern of a first pixel group of a first plurality of pixels of the event-based vision sensor including the at least one first pixel and a first plurality of adjacent pixels of the event-based vision sensor adjacent to the at least one first pixel, and determine a second pattern of a second pixel group of a second plurality of pixels including the at least one second pixel and a second plurality of adjacent pixels adjacent to the at least one second pixel, and an analyzer to detect a first location of the object based on the first pattern, detect a second location of the object based on the second pattern, and determine a depth of the object based on the first location and the second location.

According to an aspect of an exemplary embodiment, there is provided a method for analyzing an image, the method including receiving an event signal corresponding to at least one pixel of an event-based vision sensor, determining a pattern of a pixel group of a plurality of pixels of the event-based vision sensor including the at least one pixel and a plurality of adjacent pixels of the event-based vision sensor adjacent to the at least one pixel, and determining at least one of an appearance of the object and movement of the object, based on the pattern of the pixel group.

According to an aspect of an exemplary embodiment, there is provided a method for analyzing an image, the method including receiving an input of an event signal corresponding to a pixel of an event-based vision sensor indicating movement of an object, selecting a plurality of adjacent pixels of the event-based vision sensor adjacent to the pixel corresponding to the event signal 1, determining an edge pattern of the plurality of adjacent pixels, determining a position of an edge of the object based on the edge pattern of the plurality of adjacent pixels, and analyzing an appearance of the object based on the position of the edge of the object.

Other features and aspects of the exemplary embodiments will be apparent from the following detailed description, the drawings, and the claims.

BRIEF DESCRIPTION OF THE DRAWINGS

FIGS. 2A through 2C are diagrams illustrating a plurality of predetermined edge patterns according to exemplary embodiments;

FIGS. 3A and 3B are diagrams illustrating a scheme for classifying a pattern of a pixel group according to an exemplary embodiment;

FIGS. 8A through 8D are diagrams illustrating a scheme for enhancing precision of analyzing motion of an object according to an exemplary embodiment;

FIG. 12 is a block diagram illustrating an apparatus for analyzing a three-dimensional (3D) image according to an exemplary embodiment.

Figure 1:
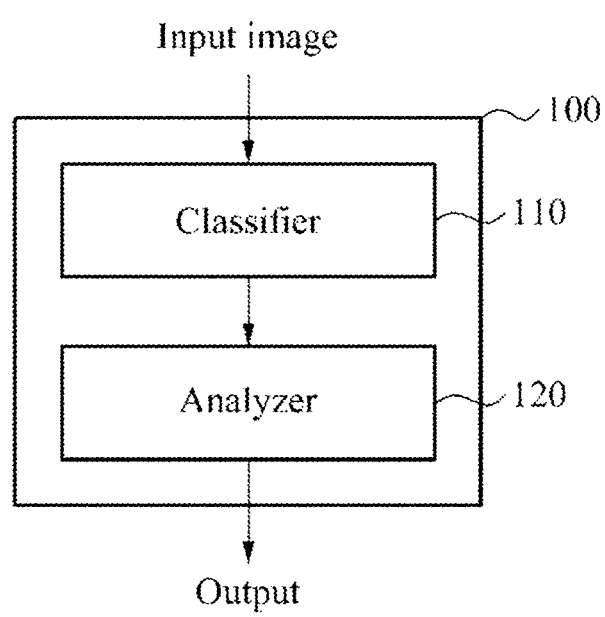
FIG. 1 is a block diagram illustrating an apparatus for analyzing an image according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be implicit to those of ordinary skill in the art. The progression of processing steps and/or operations described is an example; however, the sequence of and/or operations of the processing steps and/or operations is not limited to that set forth herein and may modified as would be understood by the artisan of ordinary skill in the art, with the exception of steps and/or operations necessarily occurring in a particular order. In addition, respective descriptions of well-known functions and constructions may be omitted for increased clarity and conciseness.

FIG. 1 is a block diagram illustrating an apparatus 100 for analyzing an image according to an exemplary embodiment.

Prior to describing the apparatus 100 for analyzing the image with reference to FIG. 1, an input image to be used by the apparatus 100 will be briefly discussed. The input image according to the exemplary embodiment may refer to an output image of an event-based vision sensor for capturing an object. The event-based vision sensor may asynchronously output an event signal in response to detection of a predetermined event. The predetermined event may include a change in brightness of light incident on the event-based vision sensor. For example, the event-based vision sensor may output an ON event corresponding to a relevant pixel when an event is detected, for example an event in which a light is illuminated in a predetermined pixel, thereby increasing brightness. Also, the event-based vision sensor may output an OFF event corresponding to a relevant pixel when an event is detected, for example an event in which a light is dimmed in a predetermined pixel, thereby decreasing brightness.

Unlike a frame-based vision sensor, the event-based vision sensor may output a portion of pixel data in which a change of light is detected, without scanning, in a frame unit, an output of a photo diode of a plurality of pixels. The brightness change of the light incident on a vision sensor may result from a movement of an object. For example, a light source is assumed to be substantially fixed, and an object is assumed not to spontaneously emit light as time elapses. In this instance, the light incident to the vision sensor may refer to a light generated from a light source and reflected off the object. When the object does not move, a brightness change of the light incident to the event-based vision sensor may not occur because there are no substantial changes in the light reflected off the stationary object. Conversely, when the object moves, the brightness change of the incident light incident to the vision sensor may occur because the light reflected off the object, and therefore light incident to the event-based vision sensor, changes based on the movement of the object.

The event-based vision sensor may include a dynamic vision sensor. The dynamic vision sensor may include a manual vision sensor that operates on a principle of a human retina and optic nerve. The dynamic vision sensor may output, to the event-based vision sensor, an event signal in response to the movement of the object. The event signal may include information asynchronously generated in response to the movement of the object. The event signal may include information, such as optic nerve information transferred from a retina to a brain of a human. For example, the event signal may be generated when a moving object is detected, while the event signal may not be generated with respect to a stationary object. At least one pixel included in the event signal may correspond to an object in which a movement is detected.

Referring to FIG. 1, the apparatus 100 for analyzing the image may include a classifier 110 and an analyzer 120. The classifier 110 may classify a pattern of at least one pixel group, based on an input image including an event signal, in which a movement of an object is detected. The at least one pixel group may include a pixel corresponding to the event signal and a plurality of pixels adjacent to the corresponding pixel.

Hereinafter, for ease of description, the pixel group may include a 3×3 matrix of 9 pixels, the pixel corresponding to the event signal is assumed to be disposed at a center of the pixel group, and 8 adjacent pixels disposed around the corresponding pixel are assumed to be included in the pixel group. Such a scheme for configuring a pixel group is only exemplary, and may be modified in a variety of manners.

The classifier 110 may determine whether a pixel group corresponding to an event signal (i.e., a group of pixels at which the event occurs) corresponds to a plurality of predetermined edge patterns. For example, referring to FIG. 2A, the plurality of predetermined edge patterns may include 24 edge patterns $P_1$ through $P_{24}$. The 24 edge patterns $P_1$ through $P_{24}$ may refer to patterns associated with an edge of an object. When the pixel group corresponding to the event signal is determined to correspond to any one of the plurality of predetermined edge patterns, the classifier 110 may determine a pattern of the pixel group corresponding to the event signal to be a corresponding edge pattern. For example, based on a result of the determination that the pixel group corresponding to the event signal corresponds to the edge pattern $P_1$ of FIG. 2A, the classifier 110 may classify the pixel group corresponding to the event signal as the edge pattern $P_1$. The classifier 110 may discard the pixel group corresponding to the event signal that is unassociated with any of the plurality of predetermined edge patterns.

Detailed descriptions related to a scheme in which the classifier 110 classifies the pattern of the pixel group corresponding to the event signal will be discussed with reference to FIGS. 2A through 3B.

The analyzer 120 may analyze at least one of an appearance, such as a shape, an outline, or a location of the object relative a position of the event-based sensor, of an object and a motion of an object, based on the pattern of the at least one pixel group classified by the classifier 110. The analyzer 120 may determine a direction of an edge corresponding to the at least one pixel group, using the pattern of the at least one pixel group, and thereby analyze the appearance of the object. Alternatively, the analyzer 120 may calculate a velocity corresponding to the pixel group associated with the edge of the object, and analyze a motion of the object, based on the calculated velocity of the pixel group. The analyzer 120 may determine at least one of a movement velocity component of the object, a rotation velocity component of the object, and a scaling velocity component of the object, to analyze the motion of the object.

Detailed descriptions related to operation of the analyzer 120 will be discussed later with reference to FIGS. 4 through 8D.

Figure 2A:
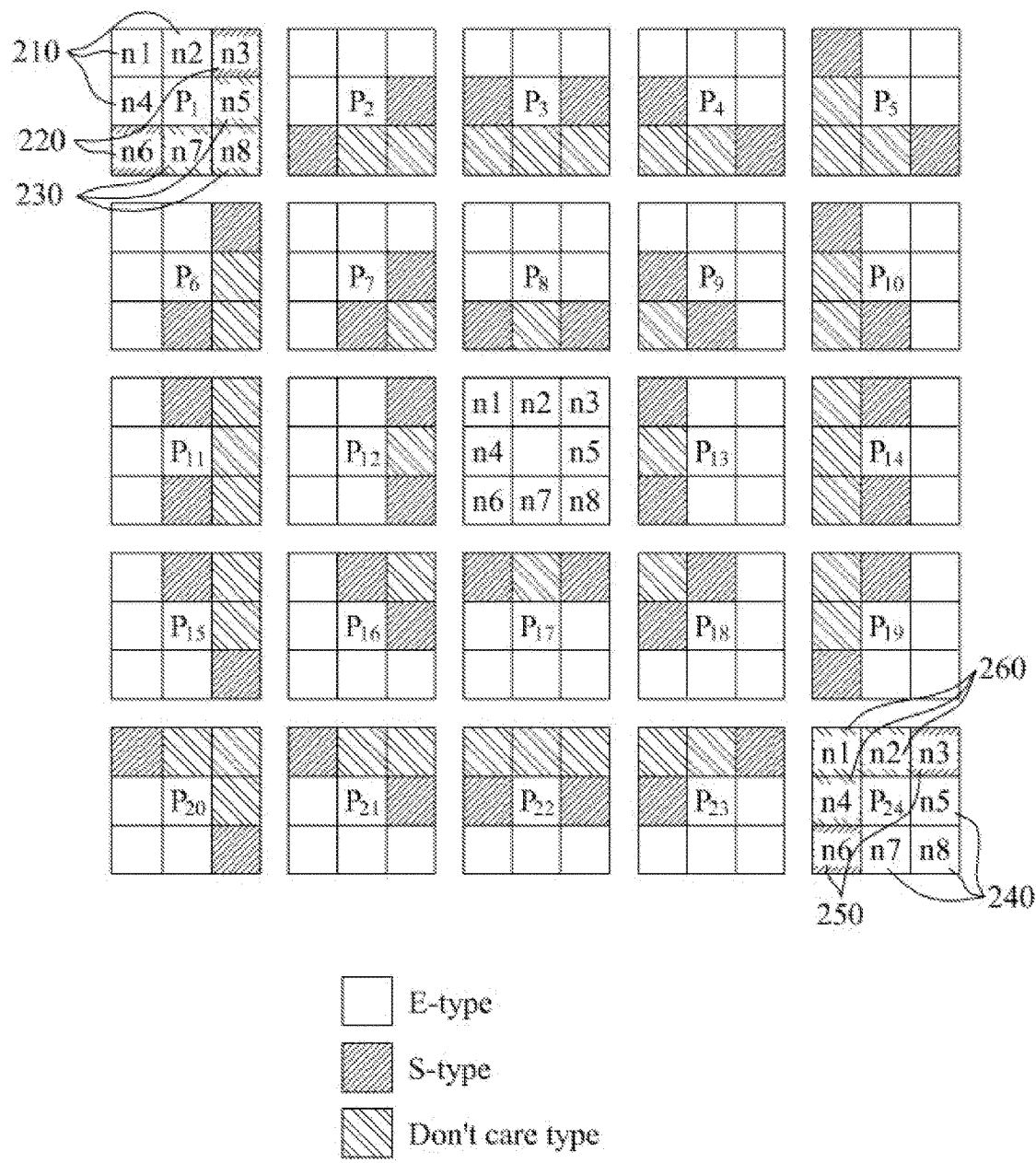

FIGS. 2A through 2C are diagrams illustrating a plurality of predetermined edge patterns according to an exemplary embodiment. Referring to FIG. 2A, a plurality of edge patterns may be associated with an edge of an object.

An event signal may include a time stamp at which a time of a predetermined event is detected, an indicator for indicating a type of an event, and an index of a pixel in which the predetermined event is detected. The time stamps corresponding to the pixels of a resolution may be stored in a table in memory, thereby time signals of event times for pixels may be utilized, as discussed below.

An apparatus for analyzing an image according to the exemplary embodiment may classify a pattern of a pixel group, based on a difference between a time stamp of a pixel, in which an event is detected, and a plurality of time stamps of adjacent pixels. The apparatus for analyzing the image may determine a plurality of types of the adjacent pixels to classify the pattern of the pixel group. The apparatus for analyzing the image may calculate the difference between the time stamp of the pixel, in which the event is detected, and the plurality of time stamps of adjacent pixels and, based on a result of the calculation, determine one or more types of the adjacent pixels.

The apparatus for analyzing the image may use a data structure for managing time stamps corresponding to a total of pixels. The apparatus for analyzing the image may update a time stamp of pixels included in an event signal when the event signal is detected. In this instance, the apparatus for analyzing the image may discard information previously stored, and store newly updated information. The apparatus for analyzing the image may update a value of the time stamp of a current pixel corresponding to a current event as a current time, when the current event is detected. The apparatus for analyzing the image may determine a pixel type of an adjacent pixel by calculating a difference between the updated time stamp of the current pixel corresponding to the current event and a time stamp of the adjacent pixel. The time stamp of the adjacent pixel might be updated when a previous event corresponding to the adjacent pixel was detected The apparatus for analyzing the image may determine a type of adjacent pixels, based on Equation 1.

$$t_{ev} - t_{nx} \begin{cases} \geq T_E \rightarrow E\text{-type} \\ \leq T_S \rightarrow S\text{-type} \end{cases} \quad [\text{Equation 1}]$$

Here, $t_{ev}$ denotes a time stamp of a pixel in which an event is generated, and $t_{nx}$ denotes a time stamp of an adjacent pixel, the difference between which indicates a temporal correlation between pixel events to indicate directional movement of an edge; $T_E$ denotes a threshold value for determining an E-type, which may be a slow event, and $T_S$ denotes a threshold value for determining an S-type, which may be a fast event. $T_E$ and Ts may be set based on sensitivity of a pixel or an application to be applied. For example, when an object, of which a movement is to be detected, corresponds to a hand of a user, $T_E$ and Ts may be set to be in a range of milliseconds (ms) to tens of ms. Alternatively, when the object, of which the movement is to be detected, corresponds to an object moving significantly faster than the hand of the user, $T_E$ and Ts may be set to a number of micro seconds (μs) or less. $T_E$ and Ts may be set to be differing values, where $T_s < T_E$, as expressed by Table 1, and may be set to be an equal value, as necessary.

When a predetermined period of time elapses from a first point of time, at which a previous event is detected, to a second subsequent point of time, at which a current event is detected in an adjacent pixel, the apparatus for analyzing the image may determine the adjacent pixel to be the E-type. For example, an adjacent pixel, in which a new event is not detected during a predetermined period of time, for example, $T_E$, from among pixels adjacent to a pixel in which a current event is detected, may be classified as an adjacent pixel of the E-type.

When a current event is detected from a point of time at which a previous event is detected within a predetermined period of time in an adjacent pixel, the apparatus for analyzing the image may determine the adjacent pixel to be the S-type. For example, an adjacent pixel, in which a new event is detected in a predetermined period of time, for example, $T_S$, from among pixels adjacent to a pixel in which a current event is detected, may be classified as an adjacent pixel of the S-type.

Predetermined edge patterns may include adjacent pixels. For example, when top, bottom, left, and right pixels are used, which are closest to a pixel in which an event is generated, predetermined edge patterns may include adjacent pixels of n1 through n8, as shown in FIG. 2A. Combinations of a type of the adjacent pixels configuring the predetermined edge patterns may differ from one another.

For example, an edge pattern $P_1$ may include pixels n1, n2, and n4 210 of the E-type, and pixels n2 and n6 220 of the S-type. The apparatus for analyzing the image may classify, as the edge pattern $P_1$, a pixel group including adjacent pixels of directions of n1, n2, and n4 210, in which a new event is not detected during a predetermined period of time, for example, $T_E$, and adjacent pixels of directions of pixels n3 and n6 220, in which a new event is detected in a predetermined period of time, for example, $T_S$. In this instance, the apparatus for analyzing the image may analyze a direction of an edge of a corresponding pixel group, using pixels n3 and n6 220 of the S-type, in which the new event is detected in the predetermined period of time, for example $T_S$. This is because, when a new event is generated based on a movement of an object, events disposed at a position of pixels included in the edge of the object may be detected at a substantially identical point of time. As will be described in detail with reference to FIG. 4, the edge pattern $P_1$ may be mapped to an edge of a direction of a line connecting pixels n3 and n6 220.

In an analogous manner, the edge pattern $P_{24}$ may include pixels n5, n7, and n8 240 of the E-type, and pixels n3 and n6 250 of the S-type. The apparatus for analyzing the image may classify, as the edge pattern $P_{24}$, a pixel group including adjacent pixels of directions of pixels n5, n7, and n8 240, in which a new event is not detected during a predetermined period of time, for example, $T_E$, and adjacent pixels of directions of pixels n3 and n6 250, in which a new event is detected during a predetermined period of time, for example, $T_S$. In this instance, the apparatus for analyzing the image may analyze a direction of an edge of a corresponding pixel group, using pixels n3 and n6 250 of the S-type, in which a new event is detected in a predetermined period of time, for example $T_S$. As will be described with reference to FIG. 4, the edge pattern $P_{24}$ may be mapped to an edge of a direction of a line connecting pixels n3 and n6 250.

An apparatus for analyzing an image according to another exemplary embodiment may employ more than the 8 adjacent pixels shown in FIG. 2A. For example, the apparatus for analyzing the apparatus may use 24 adjacent pixels of a 5×5 pixel matrix, as shown in FIG. 2B, or 48 adjacent pixels of a 7×7 pixel matrix, as shown in FIG. 2C. The exemplary embodiments in FIGS. 2A, 2B, and 2C are only exemplary, and may be modified in a variety of manners. The apparatus for analyzing the image may compare types of adjacent pixels included in a pixel group to types of adjacent pixels included in a plurality of predetermined edge patterns, and determine a pattern of the pixel group to be any one of the plurality of predetermined edge patterns. Based on a result of the comparison, the apparatus for analyzing the image may determine an edge pattern that matches the pixel group, from among the plurality of predetermined edge patterns. To determine a match, the apparatus for analyzing the image may compare the types of the adjacent pixels included in the pixel group to the types of the adjacent pixels included in the plurality of predetermined edge patterns. In one example, when a first edge pattern and a second edge pattern are included in the plurality of predetermined edge patterns, the apparatus for analyzing the image may compare the types of the adjacent pixels included in the pixel group to types of adjacent pixels included in the first edge pattern. Also, the apparatus for analyzing the image may compare the types of the adjacent pixels included in the pixel group to types of adjacent pixels included in the second edge pattern. When the types of the adjacent pixels included in the pixel group correspond to the types of the adjacent pixels included in the first edge pattern, the apparatus for analyzing the image may determine the pattern of the pixel group to be a pattern of the first edge pattern. Alternatively, when the types of the adjacent pixels included in the pixel group correspond to the types of the adjacent pixels included in the second edge pattern, the apparatus for analyzing the image may determine the pattern of the pixel group to be the second edge pattern. The apparatus for analyzing the image may determine an edge pattern having adjacent pixels corresponding to the adjacent pixels included in the pixel group to be the pattern of the pixel group.

A portion of adjacent pixels included in a predetermined edge pattern may be agnostically designated a "don't-care" type, as necessary. Such pixels are neither classified as the E-type nor the S-type. For example, the edge pattern $P_1$ may include pixels n5, n7, and n8 230 of the "don't-care" type. The edge pattern $P_{24}$ may include pixels n1, n2, and n3 260 of the "don't-care" type.

The apparatus for analyzing the image may classify a pattern of a pixel group, using adjacent pixels that do not correspond to the "don't-care" type, from among the adjacent pixels included in edge patterns. In other words, the apparatus for analyzing the image may classify the pattern of the pixel group using only those pixels classified as the E-type or the S-type. For example, the apparatus for analyzing the image may not consider pixels n5, n7, and n8 230 when the apparatus for analyzing the image determines whether the pixel group corresponds to the edge pattern $P_1$. Similarly, the apparatus for analyzing the image may not consider pixels n1, n2, and n4 260 when the apparatus for analyzing the image determines whether the pixel group corresponds to the edge pattern $P_{24}$.

The plurality of predetermined edge patterns may be stored in various manners. For example, the adjacent pixels of the E-type and the adjacent pixels of the S-type included in the 24 edge patterns $P_1$ through $P_{24}$ may be stored in a format of a bit value, as indicated in Table 1.

TABLE 1

P1E = 11010000 (D0)
P1S = 00100100 (24)
P2E = 11110000 (F0)
P2S = 00001100 (0C)
P3E = 11100000 (E0)
P3S = 00011000 (18)
P4E = 11101000 (E8)
P4S = 00010001 (11)
P5E = 01101000 (68)
P5S = 10000001 (81)
P6E = 11010100 (D4)
P6S = 00100010 (22)
P7E = 11110100 (F4)
P7S = 00001010 (0A)
P8E = 11111000 (F8)
P8S = 00000101 (05)
P9E = 11101001 (E9)
P9S = 00010010 (12)
P10E = 01101001 (69)
P10S = 10000010 (82)
P11E = 10010100 (94)
P11S = 01000010 (42)
P12E = 11010110 (D6)
P12S = 00100001 (21)
P13E = 01101011 (6B)
P13S = 10000100 (84)
P14E = 00101001 (29)
P14S = 01000010 (42)
P15E = 10010110 (96)
P15S = 01000001 (41)
P16E = 10010111 (97)
P16S = 01001000 (48)
P17E = 00011111 (1F)
P17S = 10100000 (A0)
P18E = 00101111 (2F)
P18S = 01010000 (50)
P19E = 00101011 (2B)
P19S = 01000100 (44)
P20E = 00010110 (16)
P20S = 10000001 (81)
P21E = 00010111 (17)
P21S = 10001000 (88)
P22E = 00000111 (07)
P22S = 00011000 (18)
P23E = 00001111 (0F)
P23S = 00110000 (30)
P24E = 00001011 (0B)
P24S = 00100100 (24)

Here, PnE denotes adjacent pixels of the E-type included in an edge pattern $P_n$. When 8 adjacent pixels are assumed to be used, PnE may be configured as 8 bits, which may correspond to pixels n1 through n8, respectively. A bit corresponding to an adjacent pixel of the E-type from among the 8 bits may be set to "1", and other remaining bits (either S-type or "don't care" type) may be set to "0". For example, the edge pattern $P_1$ may include pixels n1, n2, and n4 210 as the adjacent pixels of the E-type, and thus a bit value of P1E may be set to "11010000," of which a first bit, a second bit, and a fourth bit are "1". The bit value of P1E "11010000" may be represented as a hexadecimal number, and in this instance, may be represented as "D0". When 24 adjacent pixels are used according to another exemplary embodiment, PnE may be configured by 24 bits, and when 48 adjacent pixels are used, PnE may be configured by 48 bits.

Also, PnS denotes adjacent pixels of the S-type included in an edge pattern $P_n$. When 8 adjacent pixels are assumed to be used, PnS may be configured as 8 bits which may correspond to pixels n1 through n8, respectively. A bit corresponding to an adjacent pixel of the S-type from among the 8 bits may be set to "1", and other remaining bits (either E-type or "don't care" type) may be set to "0". For example, the edge pattern $P_1$ may include pixels n3 and n6 220 as the adjacent pixels of the S-type and thus, a bit value of P1S may be set to "00100100," of which a third bit and a sixth bit are "1". The bit value of P1S "00100100" may be represented as a hexadecimal number, and in this instance, may be represented as "24". When 24 adjacent pixels are used according to another exemplary embodiment, PnS may be configured by 24 bits, and when 48 adjacent pixels are used, PnS may be configured by 48 bits.

The apparatus for analyzing the image may verify whether adjacent pixels denoted by PnE correspond to the E-type, and adjacent pixels denoted by PnS correspond to the S-type, and determine whether a pixel group corresponds to an edge pattern $P_n$ on the basis of the analyzed pixels.

The apparatus for analyzing the image may not consider adjacent pixels of the "don't-care" type when a pattern of a pixel group is classified. Accordingly, the apparatus for analyzing the image may not use information explicitly indicating the adjacent pixels of the "don't-care" type. For example, bits corresponding to the adjacent pixels of the "don't care" type in an edge pattern $P_n$ may be set to "0" in PnE and PnS both. However, a "0" bit related to a result in which an OR operation in a bit unit is performed on PnE and PnS may denote an adjacent pixel of the "don't care" type. For example, when the logical OR operation in the bit unit is performed on P1E="11010000" and P1S="00100100", P1E OR P1S="11110100". P1E OR P1S="11110100" may indicate that the adjacent pixels of the "don't care" type included in the edge pattern $P_1$ may be pixels n5, n7, and n8 230 because a "0" bit in P1E OR P1S may correspond to a fifth bit, a seventh bit, and an eighth bit.

Table 1 is an exemplary embodiment for representing an adjacent pixel of the E-type and an adjacent pixel of the S-type included in an edge pattern $P_n$. Those skilled in the art will understand various modifications to Table 1 to represent the adjacent pixel of the E-type and the adjacent pixel of the S-type included in the edge pattern $P_n$.

Figure 3B:
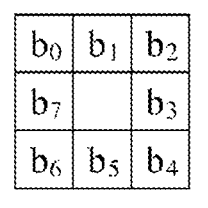

FIGS. 3A and 3B are diagrams illustrating a scheme for classifying a pattern of a pixel group according to an exemplary embodiment.

Referring to FIG. 3A, 24 edge patterns $P_1$ through $P_{24}$ may be grouped into 6 groups 310, 320, 330, 340, 350, and 360. For example, the 24 edge patterns $P_1$ through $P_{24}$ may be grouped into the 6 groups 310 through 360, based on whether adjacent pixels of an E-type are commonly present. The group 310 may be configured by edge patterns $P_1$, $P_2$, $P_6$, $P_7$, and $P_g$ including n1, n2, and n4 of the E-type. The group 320 may consist of edge patterns $P_4$, $P_5$, $P_9$, $P_{10}$, and $P_{13}$, each of which includes pixels n2, n3, and n5 of the E-type. Common pixels in a group from among pixels represented in the E-type in FIGS. 2A through 2C may be represented as a cross-hatched pattern, as indicated in FIG. 3A.

The 6 groups and the edge patterns included in the 6 respective groups may be divided into a masking bit value (E) and additional bit values (G) as shown in Table 2.

TABLE 2

E1: 11010000
G11: 00000100
G12: 00100000
G13: 00001000

TABLE 2-continued

E2: 01101000
G21: 10000000
G22: 00000001
G23: 00000010
E3: 00010110
G31: 00000001
G32: 10000000
G33: 01000000
E4: 00001011
G41: 00100000
G42: 00000100
G43: 00010000
G51: 01000010
G52: 00011000

The apparatus for analyzing the image may verify whether adjacent pixels at a position corresponding to the masking bit value (E) from among adjacent pixels of a pixel group corresponds to the E-type to determine a group to which a pattern of the pixel group corresponds. The apparatus for analyzing the image may verify whether adjacent pixels at a position corresponding to the additional bit values (G) of a corresponding group correspond to the E-type to determine a pattern of the pixel group.

For example, a first bit, a second bit, and a fourth bit of a masking bit E1 representative of the group 310 may be set to "1" because the edge patterns $P_1$, $P_2$, $P_6$, $P_7$, and $P_g$ included in the group 310 include pixels n1, n2, and n4 of the E-type. The apparatus for analyzing the image may verify whether pixels n1, n2, and n4 correspond to adjacent pixels of the E-type, using the masking bit E1 to determine whether the pixel group is included in the group 310.

Also, the apparatus for analyzing the image may determine an edge pattern corresponding to a pixel group classified as the group 310, using bit values G11, G12, and G13. For example, bit value G11 may refer to an additional bit value of which a sixth bit is set to "1". The apparatus for analyzing the image may verify whether pixel n6 of the pixel group corresponds to the E-type, using G11.

The apparatus for analyzing the image may determine that the pixel group corresponds to the edge pattern $P_6$ or the edge pattern $P_7$, based on a result of the determination that pixel n6 of the pixel group corresponds to the E-type. Further, the apparatus for analyzing the image may verify whether pixel n3 of the pixel group corresponds to the E-type, using bit value G12 to determine a pattern to which the pixel group corresponds from among the edge pattern $P_6$ and the edge pattern $P_7$. For example, when pixel n3 of the pixel group corresponds to the E-type, the apparatus for analyzing the image may determine that the pixel group corresponds to the edge pattern $P_7$. Conversely, when pixel n3 of the pixel group does not correspond to the E-type, the apparatus for analyzing the image may determine that the pixel group corresponds to the edge pattern $P_6$.

Based on a result of the determination that pixel n6 of the pixel group does not correspond to the E-type, the apparatus for analyzing the image may determine that the pixel group corresponds to the edge pattern $P_1$, $P_2$, or $P_8$. Moreover, the apparatus for analyzing the image may verify whether pixel n3 of the pixel group corresponds to the E-type, using bit value G12, and when pixel n3 of the pixel group does not correspond to the E-type, the apparatus for analyzing the image may determine that the pixel group corresponds to the edge pattern $P_1$. The apparatus for analyzing the image may verify whether pixel n5 of the pixel group corresponds to the E-type, using G13, when pixel n3 of the pixel group corresponds to the E-type. When pixel n5 of the pixel group corresponds to the E-type, the apparatus for analyzing the image may determine that the pixel group corresponds to the edge pattern $P_8$, and when pixel n5 does not correspond to the E-type, the apparatus for analyzing the image may determine that the pixel group corresponds to the edge pattern $P_2$.

The apparatus for analyzing the image may determine that a pattern of the pixel group belongs to the group 350 or group 360 when adjacent pixels at a position corresponding to masking bit values of E1 through E4 do not correspond to the E-type. The apparatus for analyzing the image may verify whether adjacent pixels at a position corresponding to additional bit values of bit values G51 and G52 correspond to an S-type, and determine a group to which the pixel group belongs from among the group 350 and the group 360.

In one example, the apparatus for analyzing the image may determine whether the pixel group belongs to the group 360, using bit value G51, which may refer to an additional bit value of which a second bit and a seventh bit are set to "1". The apparatus for analyzing the image may verify whether pixels n2 and n7 of the pixel group correspond to the S-type, using bit value G51, to determine whether the pixel group belongs to the group 360. Additionally, the apparatus for analyzing the image may further verify whether a single adjacent pixel remaining (subsequent to excluding pixels n2 and n7) corresponds to the E-type to determine a pattern to which the pixel group corresponds from among an edge pattern $P_{11}$ and an edge pattern $P_{14}$.

Also, the apparatus for analyzing the image may determine whether the pixel group belongs to the group 350, using bit value G52, which may refer to an additional bit value of which a fourth bit and a fifth bit are set to "1". The apparatus for analyzing the image may verify whether pixels n4 and n5 of the pixel group correspond to the S-type, and determine whether the pixel group belongs to the group 350. Moreover, the apparatus for analyzing the image may further verify whether a single adjacent pixel remaining (subsequent to excluding pixels n4 and n5) corresponds to the E-type, and determine a pattern to be classified as a pattern of the pixel group from among the edge pattern $P_3$ and an edge pattern $P_{22}$.

Referring to FIG. 3B, the apparatus for analyzing the image may classify an edge pattern of a corresponding pixel group, using adjacent pixels of the E-type included in a pixel group. The apparatus for analyzing the image may classify an edge pattern of the pixel group, as will be discussed later, when a threshold value $T_E$ for an adjacent pixel of the E-type is equal to a threshold value $T_S$ for an adjacent pixel of the S-type.

More particularly, the apparatus for analyzing the image may verify whether adjacent pixels $b_0$ through $b_7$ correspond to an adjacent pixel of the E-type. When a plurality of adjacent pixels corresponds to the E-type, the apparatus for analyzing the image may set a bit corresponding to a relevant pixel to "1", and otherwise, set a bit corresponding to a relevant pixel to "0". The apparatus for analyzing the image may calculate P-val, based on Equation 2.

$$P\text{-val} = (B<<1) \text{ AND } B \text{ AND } (B>>1) \quad \text{[Equation 2]}$$

Here, B denotes a bit value of 8 bits, for example, $b_0b_1b_2b_3b_4b_5b_6b_7$; (B<<1) denotes a value obtained through cyclic bit shifting of the bit values the 8 bits B to left for a degree of 1 bit in a bit unit, for example, $b_1b_2b_3b_4b_5b_6b_7b_0$; (B>>1) denotes a value obtained through cyclic bit shifting of the bit values of the 8 bits B to right for a degree of 1 bit in a bit unit, for example, $b_7b_0b_1b_2b_3b_4b_5b_6$; P-val denotes a bit value obtained through performing an a logical AND operation on (B<<1), B, and (B>>1) in a bit unit.

The apparatus for analyzing the image may determine an edge pattern from the calculated P-val, using a lookup table (LUT), as shown in Table 3. For example, when the calculated P-val is "00000001", the apparatus for analyzing the image may determine that a relevant pixel group corresponds to an edge pattern $P_{11}$. The apparatus for analyzing the image may determine that the calculated P-val does not correspond to any of predetermined edge patterns when the calculated P-val is a value absent from the LUT of Table 3.

TABLE 3

| | P-val | |
|---|---|---|
| Dec | Bin | Ptn |
| 1 | 00000001 | $P_{11}$ |
| 2 | 00000010 | $P_{20}$ |
| 3 | 00000011 | $P_{15}$ |
| 4 | 00000100 | $P_{22}$ |
| 6 | 00000110 | $P_{21}$ |
| 7 | 00000111 | $P_{16}$ |
| 8 | 00001000 | $P_{24}$ |
| 12 | 00001100 | $P_{23}$ |
| 14 | 00001110 | $P_{17}$ |
| 16 | 00010000 | $P_{14}$ |
| 17 | 00010001 | $P_{11}, P_{14}$ |
| 24 | 00011000 | $P_{19}$ |
| 28 | 00011100 | $P_{18}$ |
| 32 | 00100000 | $P_5$ |
| 34 | 00100010 | $P_5, P_{20}$ |
| 48 | 00110000 | $P_{10}$ |
| 56 | 00111000 | $P_{13}$ |
| 64 | 01000000 | $P_3$ |
| 68 | 01000100 | $P_3, P_{22}$ |
| 96 | 01100000 | $P_4$ |
| 112 | 01110000 | $P_9$ |
| 128 | 10000000 | $P_1$ |
| 129 | 10000001 | $P_6$ |
| 131 | 10000011 | $P_{12}$ |
| 136 | 10001000 | $P_1, P_{24}$ |
| 192 | 11000000 | $P_2$ |
| 193 | 11000001 | $P_7$ |
| 224 | 11100000 | $P_8$ |

When a P-val is equal to decimal 17, 34, 68, and 136, two edge patterns may be a candidate. A P-val corresponding to two edge patterns may be attributed to an instance in which an adjacent pixel of a "don't care" type corresponds to an adjacent pixel of an E-type, and the apparatus for analyzing the image may select any one of the possible edge patterns, based on a predetermined rule. For example, the apparatus for analyzing the image may determine a type of an additionally predetermined adjacent pixel, and select any one of the edge patterns from among the two edge patterns. Alternatively, the apparatus for analyzing the image may randomly select any one of the edge patterns.

Figure 4:
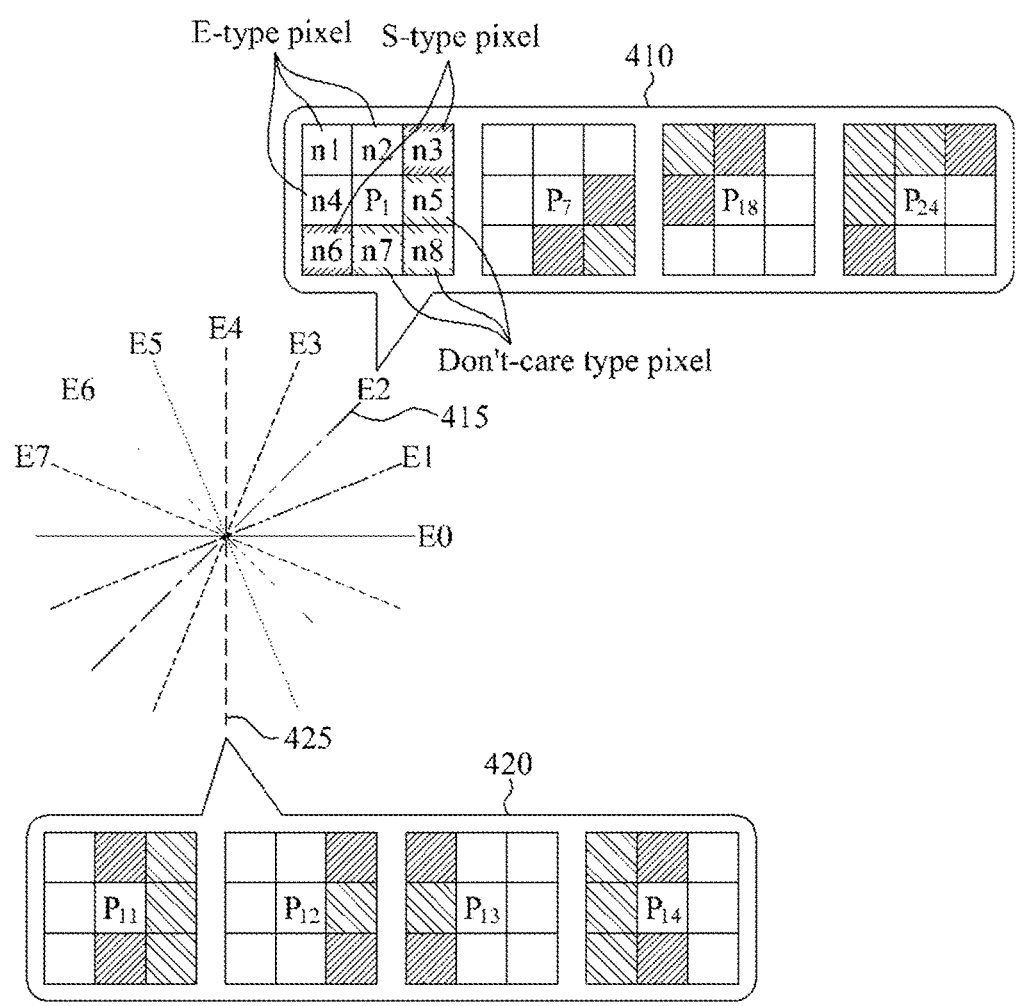
FIG. 4 is a diagram illustrating a scheme for determining a direction of an edge of a pixel group according to an exemplary embodiment.

FIG. 4 is a diagram illustrating a scheme for determining a direction of an edge of a pixel group according to an exemplary embodiment. Referring to FIG. 4, a plurality of predetermined edge patterns may be mapped to an edge having a predetermined direction.

The plurality of predetermined edge patterns may be mapped to an edge having a primary direction in which adjacent pixels of an S-type are disposed. For example, edge patterns $P_1$, $P_7$, $P_{18}$, and $P_{24}$ 410 may be mapped to an edge 415 having an E2-th direction. Also, edge patterns $P_{11}$, $P_{12}$, $P_{13}$, and $P_{14}$ 420 may be mapped to an edge 425 having an E4-th direction. As shown in Table 4, 24 edge patterns may be mapped to edges in 8 directions.

TABLE 4

| | |
|---|---|
| P1 | E2 |
| P2 | E1 |
| P3 | E0 |
| P4 | E7 |
| P5 | E6 |
| P6 | E3 |
| P7 | E2 |
| P8 | E0 |
| P9 | E6 |
| P10 | E5 |
| P11 | E4 |
| P12 | E4 |
| P13 | E4 |
| P14 | E4 |
| P15 | E5 |
| P16 | E6 |
| P17 | E0 |
| P18 | E2 |
| P19 | E3 |
| P20 | E6 |
| P21 | E7 |
| P22 | E0 |
| P23 | E1 |
| P24 | E2 |

The apparatus for analyzing the image may classify a pattern of a pixel group corresponding to a pixel in which an event is detected. The plurality of classified patterns may be mapped to edges of Table 4, and therefore, the apparatus for analyzing the image may recognize a direction of an edge in a plurality of pixels in which an event is detected. For example, edge patterns mapped using Table 4 may be stored as an edge in a plurality of events, and the apparatus for analyzing the image may combine edge information stored with respect to the plurality of pixels to determine an appearance of an object.

More particularly, motion of a user's hand is an example of an instance in which the apparatus for analyzing the image receives an event signal generated by the motion. In this instance, event pixels may include both pixels corresponding to an edge of the user's hand and pixels corresponding to an inner portion of the user's hand. The apparatus for analyzing the image may determine an edge pattern to which a plurality of pixels of the event pixels corresponds. Here, predetermined edge patterns may include edge patterns corresponding to an edge. Accordingly, the apparatus for analyzing the image may determine that the pixels corresponding to the inner portion of the hand do not correspond to any of the predetermined edge patterns, and determine that pixels corresponding to the edge of the user's hand correspond to any one of the predetermined edge patterns. When the plurality of pixels corresponding to the edge of the hand of the person are determined to correspond to any one of the predetermined edge patterns, the apparatus for analyzing the image may determine a direction of an edge corresponding to a relevant edge pattern in the plurality of pixels corresponding to the edge of the hand of the person, based on Table 4. As a result, the apparatus for analyzing the image may determine the direction of the edge in the plurality of pixels corresponding to the edge of the user's hand, and determine an appearance of the user's hand by integrating directions of the plurality of edges.

Figure 5A:
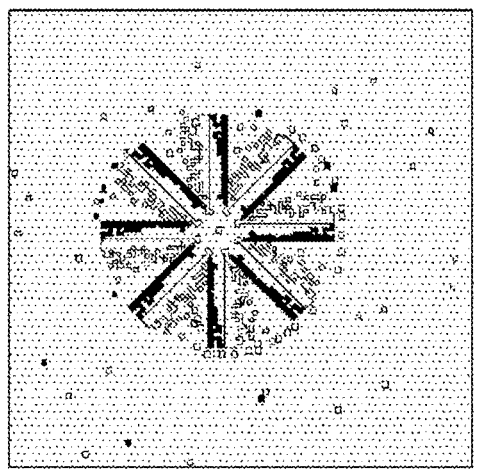
FIGS. 5A and 5B are diagrams illustrating a scheme for analyzing an appearance of an object, based on an input image according to an exemplary embodiment.
Figure 5B:
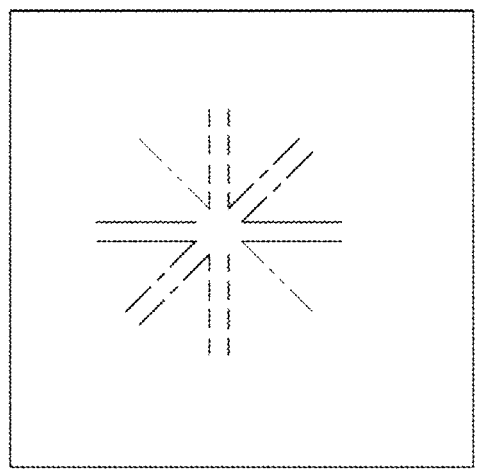

FIGS. 5A and 5B are diagrams illustrating a scheme for analyzing an appearance of an object, based on an input image according to an exemplary embodiment.

Referring to FIG. 5A, an input image may be an output of an event-based vision sensor which captures 8 rods, disposed around a center of a cylinder, rotating in a clockwise manner at an equal rotation velocity. In this instance, the event-based vision sensor may output an event signal through detection of an illuminating event and a dimming event. For example, the event-based vision sensor may output an event signal through detection of an increase or a decrease in brightness of a plurality of pixels in an image, by the 8 rods rotating in a clockwise direction, to a degree that is greater than a predetermined value. In FIG. 5A, a black point (■) may refer to an output of a sensor detecting the dimming event, in which the brightness decreases by at least the predetermined value, and a white point (□) may refer to an output detecting the illuminating event, in which the brightness increases by at least the predetermined value. Referring to FIG. 5B, the apparatus for analyzing the image may analyze the appearance of the object, using the input image of FIG. 5A.

The apparatus for analyzing the image may select a pixel group corresponding to predetermined edge patterns, based on schemes described through FIGS. 1 through 4, and estimate the appearance of the object, based on a direction of an edge corresponding to the selected pixel group. Transitively, the apparatus for analyzing the image may efficiently remove noise included in an input image, due to a trailing effect, and the like.

The apparatus for analyzing the image may analyze a motion of the object, aside from the appearance of the object. The apparatus for analyzing the image may calculate a velocity at a plurality of pixels corresponding to the edge of the object, and analyze the motion of the object, using a velocity at the plurality of pixels corresponding to the edge, subsequent to analyzing the appearance of the object from an event signal. Hereinafter, an operation in which the apparatus for analyzing the image calculates the velocity at the plurality of pixels corresponding to the edge of the object will be described with reference to FIG. 6, and an operation in which the apparatus for analyzing the image analyzes the motion of the object will be discussed with reference to FIG. 7.

Figure 6:
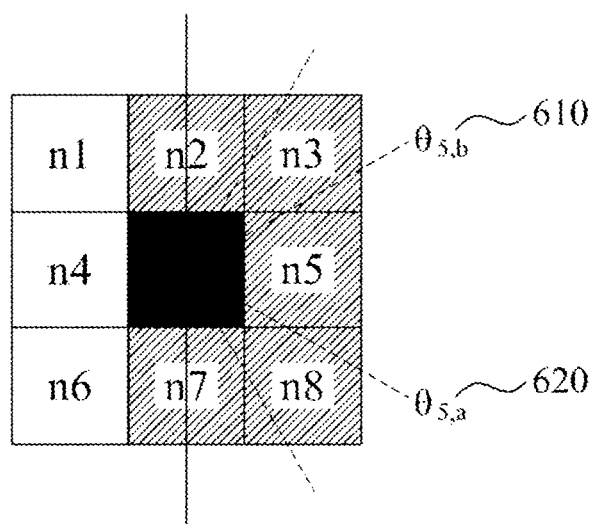
FIG. 6 is a diagram illustrating a scheme for calculating a velocity corresponding to a pixel group according to an exemplary embodiment.

FIG. 6 is a diagram illustrating a scheme for calculating a velocity corresponding to a pixel group according to an exemplary embodiment. Referring to FIG. 6, the pixel group may include movement direction information, and an apparatus for analyzing an image may calculate a velocity corresponding to the pixel group, using adjacent pixel groups.

Here, the apparatus for analyzing the image may calculate a velocity of a pixel group corresponding to an edge of an object. For example, the apparatus for analyzing the image may calculate a velocity of a corresponding pixel group with respect to a pixel group classified as predetermined edge patterns $P_1$ through $P_{24}$ of FIGS. 2A through 2C, rather than calculate a velocity of the corresponding pixel group with respect to a plurality of pixels included in an event signal. As described in the foregoing, the apparatus for analyzing the image may calculate the velocity of the pixel group corresponding to the edge of the object because the predetermined edge patterns $P_1$ through $P_{24}$ may include edge patterns corresponding to the edge of the object.

The apparatus for analyzing the image may calculate an x axis direction velocity $V_x$ and a y axis direction velocity $V_y$ corresponding to a pixel group, based on Equation 3.

$$\begin{pmatrix} V_x \\ V_y \end{pmatrix} = \sum_{i=1, S\text{-}Type}^{8} \alpha_i \begin{pmatrix} dx_i/dt_i \\ dy_i/dt_i \end{pmatrix},$$ [Equation 3]

-continued $$\alpha_i = \left| \int_{\theta_{i,a}}^{\theta_{i,b}} \cos(\theta)\, d\theta \right|$$

$\theta_{i,a}$ and $\theta_{i,b}$ denote boundary angles covering an i-th adjacent pixel of an S-type, based on a center of a pixel group. For example, when pixel n5 is the S-type, $\theta_{5,a}$ 620 and $\theta_{5,b}$ 610 may be boundary angles covering pixel n5, based on a center of a pixel group.

The apparatus for analyzing the image may mitigate sensitivity with respect to noise of a time stamp, based on Equation 4.

$$\begin{pmatrix} V_x \\ V_y \end{pmatrix} = \sum_{i=1, S\text{-}Type}^{8} \alpha_i \begin{pmatrix} dx_i / \langle dt \rangle \\ dy_i / \langle dt \rangle \end{pmatrix},$$ [Equation 4]

$$\alpha_i = \left| \int_{\theta_{i,a}}^{\theta_{i,b}} \cos(\theta)\, d\theta \right|$$

Here, <dt> denotes the same value as Equation 5.

$$\langle dt \rangle = \frac{\sum_{i=1, S\text{-}Type}^{8} dt_i}{\# \text{ of } S\text{-Type neighbors}}$$ [Equation 5]

The apparatus for analyzing the image may store a velocity corresponding to a pixel group, and the velocity may include an x axis direction velocity $V_x$, and a y axis direction velocity $V_y$ calculated through Equations 3 through 5. The velocity corresponding to the pixel group may refer to a velocity of an event pixel positioned at a center of a corresponding pixel group. As described in the foregoing, the apparatus for analyzing the image may calculate the x axis direction velocity $V_x$ and the y axis direction velocity $V_y$ with respect to event pixels corresponding the edge of the object, using the predetermined edge patterns. Hereinafter, a method for analyzing a motion of an object will be described, using velocities of event pixels corresponding to an edge of an object with reference to FIG. 7.

Figure 7:
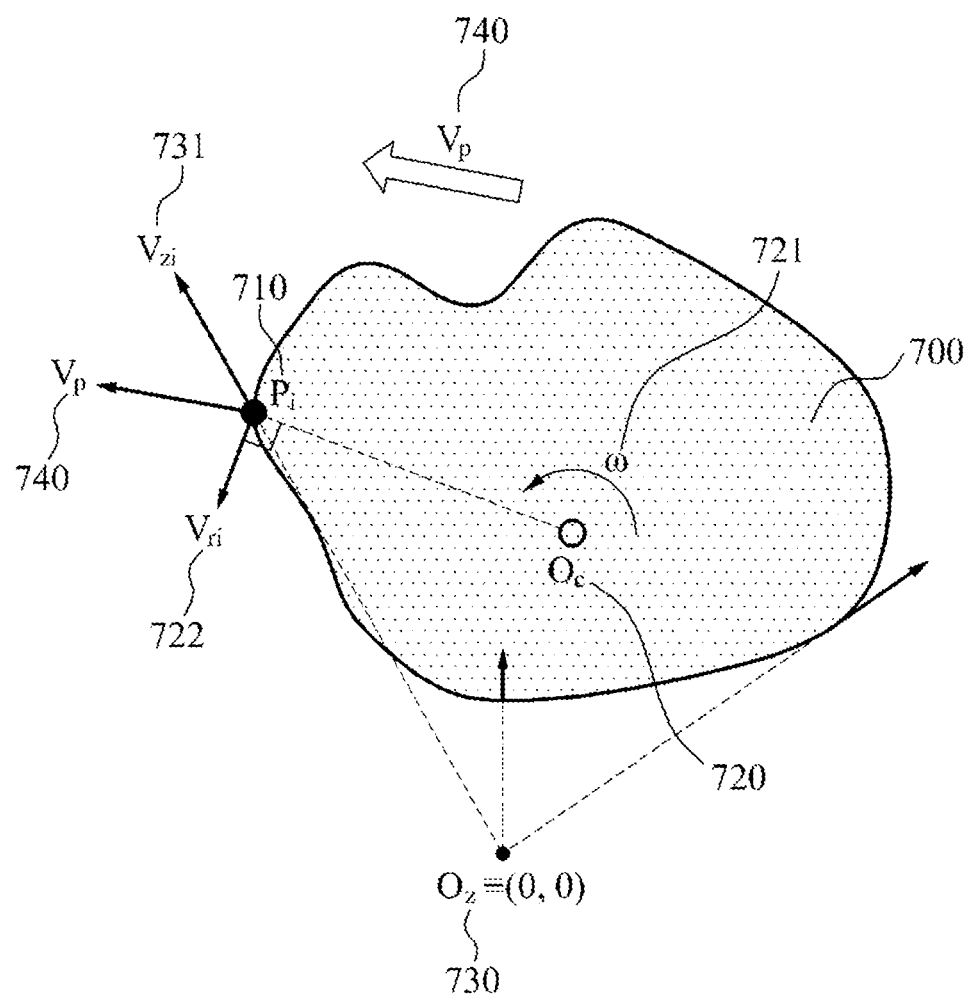
FIG. 7 is a diagram illustrating a scheme for analyzing a motion of an object using a rigid body model according to an exemplary embodiment.

FIG. 7 is a diagram illustrating a scheme for analyzing a motion of an object, using a rigid body model according to an exemplary embodiment. Referring to FIG. 7, an apparatus for analyzing an image may analyze a 4-degree of freedom (4-DOF) motion of an object 700.

For example, according to the exemplary embodiment, an input image is used, in which a movement of the object 700 is detected. The object 700 may move at a movement velocity $V_p$ 740 on a two-dimensional (2D) surface. Alternatively, the object 700 may rotate at an angular velocity ω 721, based on a rotation center $O_c$ 720. Alternatively, the object 700 may be expanded or contracted to a scaling velocity $V_z$, based on a scaling center $O_z$ 730.

The apparatus for analyzing the image may analyze a movement velocity component, a rotation velocity component, and a scaling velocity component of the object 700. The apparatus for analyzing the image may calculate a velocity $V_i$ at a predetermined point $P_i$ 710 present on an edge of the object 700, using descriptions provided with reference to FIGS. 1 through 6. For example, the velocity $V_i$ may refer to an x axis direction velocity $V_x$ and a y axis direction velocity $V_y$ calculated based on Equations 3 through 5.

The apparatus for analyzing the image may model the velocity $V_i$ as expressed by Equation 6.

$$V_{zi} + V_{ri} + V_p = V_i$$ [Equation 6]

Here, $V_{zi}$ 731, $V_{ri}$ 722, and $V_p$ 740 may refer to the scaling velocity component, the rotation velocity component, and the movement velocity component at a point Pi 710. The apparatus for analyzing the image may model the velocity $V_i$ as shown in Equation 6 to decompose the velocity $V_i$ located at the point Pi 710 disposed on the edge of the object 700 into the scaling velocity component, the rotation velocity component, and the movement velocity component. Here, Equation 6 may be defined as Equation 7.

$$tP_i + \omega A(P_i - O_c) + V_p = V_i$$ [Equation 7]

Here, $tP_i$ denotes a scaling velocity component, a coordinate $P_i$ 710 having $O_z$ 730 as an origin may represent a direction and a size of a vector $V_{zi}$ 731, and a parameter t may perform scaling on the size of the vector $V_{zi}$ 731; $\omega A(P_i - O_c)$ denotes a rotation velocity component, a coordinate difference $(P_i - O_c)$ may represent a direction and a size of a vector heading toward the coordinate $P_i$ 710 from a rotation center $O_c$ 720; and a matrix A denotes a rotation matrix for rotating a vector heading toward the coordinate $P_i$ 710 from the rotation center $O_c$ 720, for example, a matrix $$A = \begin{pmatrix} 0 & -1 \\ 1 & 0 \end{pmatrix}.$$

The vector rotated due to the matrix A may point to a vector $V_{ri}$ 722, and a parameter ω may perform scaling on a size of the vector $V_{ri}$ 722.

The apparatus for analyzing the image may calculate the scaling velocity component parameter t, the rotation velocity component parameter ω, the rotation center $O_c$, and the movement velocity component $V_p$, based on Equation 7. This is because the apparatus for analyzing the image is aware of the coordinate $P_i$ 710 of a plurality of points located at an edge and velocities $V_i$ at the corresponding points. The apparatus for analyzing the image may analyze at least one of the movement velocity component, the rotation velocity component, and the scaling velocity component, for example, the 4-DOF of the object.

The method for calculating the scaling velocity component parameter t, the rotation velocity component parameter ω, the rotation center $O_c$, and the movement velocity component $V_p$, based on Equation 7, may be implemented in various manners. Equation 8 may be derived from Equation 7 according to the exemplary embodiment.

$$t(P_i - \overline{P}) + \omega A(P_i - \overline{P}) = V_i - \overline{V}$$ [Equation 8]

Here, $P_i$ denotes a coordinate of an i-th point located on an edge of the object 700, and $\overline{P}$ denotes an average of coordinates of points located on the edge of the object 700. $V_i$ denotes a velocity at an i-th point located on the edge of the object 700, and $\overline{V}$ denotes an average of velocities at points located on the edge of the object 700. A plurality of variables may be defined in Equations 9 through 12.

$$P_i = (x_i, y_i)$$ [Equation 9]

-continued $$\overline{P} = \left( \frac{1}{N} \sum_{i=1}^{N} x_i, \frac{1}{N} \sum_{i=1}^{N} y_i \right)$$ [Equation 10]

$$V_i = (V_{xi}, V_{yi})$$ [Equation 11]

$$\overline{V} = \left( \frac{1}{N} \sum_{i=1}^{N} V_{xi}, \frac{1}{N} \sum_{i=1}^{N} V_{yi} \right)$$ [Equation 12]

The apparatus for analyzing the image may calculate an x axis direction velocity $V_x$ and a y axis direction velocity $V_y$, and store the calculated $V_x$ and $V_y$ as a velocity $V_i$ at a pixel $P_i$, based on Equations 3 through 5. The apparatus for analyzing the image may calculate $\overline{P}$ and $\overline{V}$, using the coordinate $P_i$ for a plurality of pixels and the velocity $V_i$ for a plurality of pixels. The apparatus for analyzing the image may calculate the parameter t and the parameter ω, using a plurality of $P_i$s, a plurality of $V_i$s, $\overline{P}$, $\overline{V}$, and Equation 8. For example, Equations 13 and 14 may be derived from Equation 8, based on a pseudo inverse scheme.

$$t = \frac{\sigma(x, V_x) + \sigma(y, V_y)}{\sigma^2(P)}$$ [Equation 13]

$$\omega = \frac{\sigma(x, V_y) - \sigma(y, V_x)}{\sigma^2(P)}$$ [Equation 14]

Here, $\sigma^2(P)=\sigma^2(x)+\sigma^2(y)$, $\sigma(\cdot)$ denotes an operator for calculating a standard deviation; $\sigma(x, y)=E[(x-E[x])(y-E[y])]$; and $E[\cdot]$ denotes an expectation value, or an average. The apparatus for analyzing the image may calculate the scaling velocity component parameter t and the rotation velocity component ω, based on Equations 13 and 14.

FIGS. 8A through 8D are diagrams illustrating a scheme for enhancing precision of analyzing a motion of an object 800 according to an exemplary embodiment.

Figure 8A:
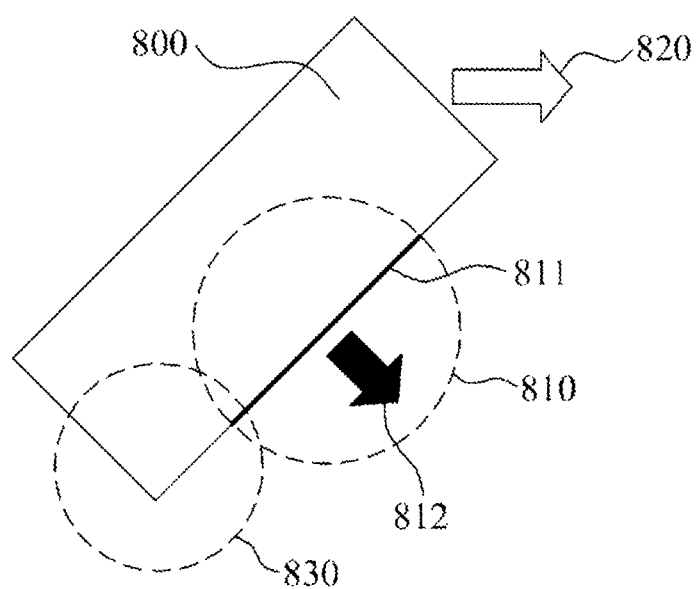

Referring to FIG. 8A, an apparatus for analyzing an image may enhance the motion analysis precision, using an observation area 810 having a size greater than a size of a pixel group. The observation area 810 may refer to a collection of pixel groups 811, including a plurality of pixel groups. For example, the observation area 810 may include an area created by segmenting the object 800 into identical sizes, along an edge of the object 800.

In selecting the observation area 810, the apparatus for analyzing the image may determine a variety of patterns of the pixel groups 811 to be included. For example, the apparatus for analyzing the image may select an observation area having a varied pattern of pixel groups 811, and perform motion analysis.

For example, an instance in which the object 800 moves rightward 820 without rotating, contracting, and expanding is assumed. Here, the object 800 may refer to an object having a rectangular shape, and may be an object moving while tilted or oriented in an oblique manner. The observation area 810 may include pixel groups 811 having an identical or similar pattern. When the motion analysis is performed based on the pixel groups 811 included in the observation area 810, a direction of an actual movement may be analyzed as moving toward a lower right direction 812, although the direction of the actual movement is the rightward direction 820. The apparatus for analyzing the image may select an observation area 830 including a non-linear portion, rather than the observation area 810 including a linear portion, in the edge of the object 800. The apparatus for analyzing the image may enhance the precision of analyzing the motion, through selecting an observation area including a varied pattern of pixel groups.

An apparatus for analyzing an image according to another exemplary embodiment may enhance precision in analyzing a motion, using a level of homogeneity (LOH). For example, the apparatus for analyzing the image may calculate the LOH of a patch, and select a patch having a low LOH, based on Equation 15. Here, the patch may include a pixel group of a size that is greater than 3×3 pixels.

$$\text{Level Of Homogeneity}(LOH) \equiv \sum_{i \in Patch}^{N} \cos^2(\theta_{ref} - \theta_i)$$ [Equation 15]

Here, $\theta_{ref}$ and $\theta_i$ denote an edge angle (i.e., orientation) of a pixel located at a center of a plurality of patches, and an edge angle (i.e., orientation) of an i-th adjacent pixel. When the LOH is low, patterns of a pixel group included in a corresponding patch may bear a degree of similarity to one another, and when the LOH is high, patterns of a pixel group included in a corresponding patch may be dissimilar. The apparatus for analyzing the image may select a patch having a low LOH, and select an observation area including a varied pattern of pixel groups. Thus, edges may be classified, and orientation of the edges may be used to determine important features of the image, which may be further employed to determine shape and/or movement of an object.

Figure 8B:
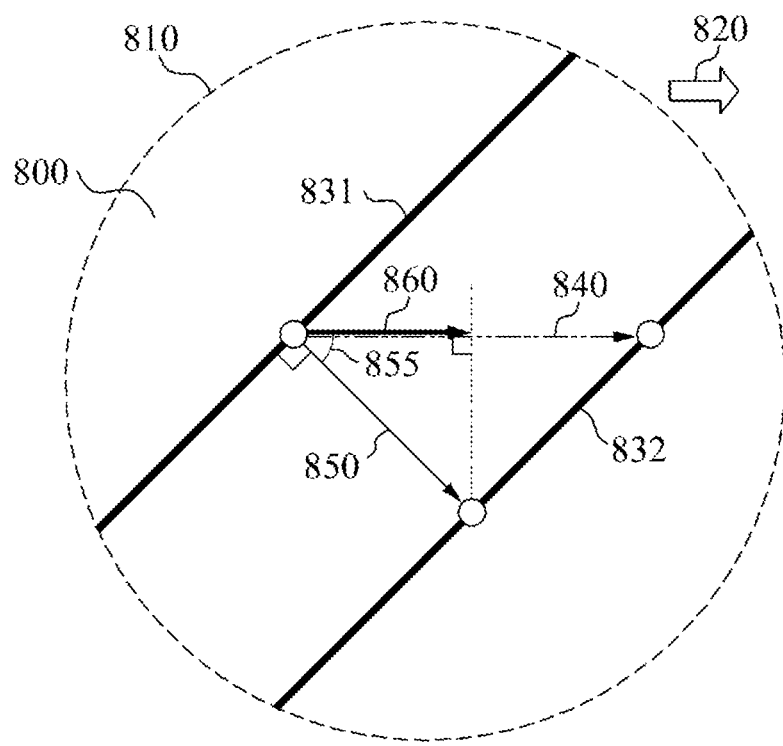

FIG. 8B is an example illustrating that the precision of analyzing the motion using the LOH is enhanced. For example, an instance in which the object 800 moves in the rightward direction 820 is assumed. When a movement of the object 800 is observed in the observation area 810, the edge of the object 800 may be observed as an edge 831 at a point of time t, and as an edge 832 at a subsequent point of time t+Δt. In this instance, a velocity of an actual movement of the object 800 may be represented as a velocity vector 840 because the object 800 moves in the rightward direction 820. When the motion analysis using the LOH is not used, a movement velocity of the object 800 may be calculated to be a velocity vector 850. The velocity vector 850 may differ in a direction and a size from the velocity vector 840 representing the actual movement velocity.

When the motion analysis using the LOH is used, the movement velocity of the object 800 may be calculated to be a velocity vector 860. A direction of the velocity vector 860 may be identical to a direction of the velocity vector 840 representing the actual movement of the object 800, however, a size of the velocity vector 860 may differ from a size of the velocity vector 840.

Figure 8C:
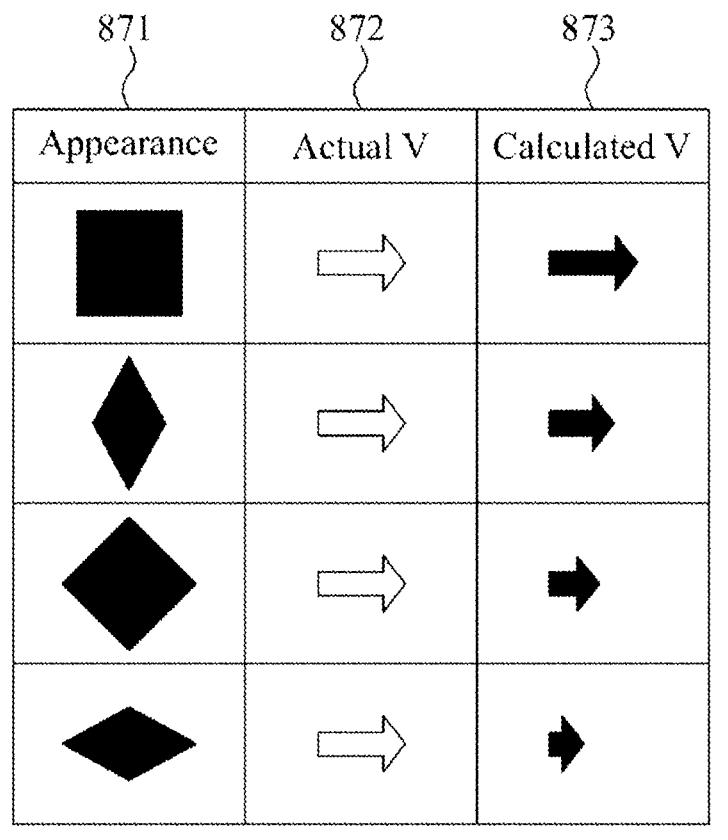

Referring to FIG. 8C, a size of a velocity 873 calculated based on an appearance 871 of the object 800 may vary although objects move at an actual velocity 872 having an identical velocity and direction. For example, the smaller a vector component appears in a direction toward the direction of an actual movement, for example, an x axis direction, the smaller a size of a calculated velocity.

Figure 8D:
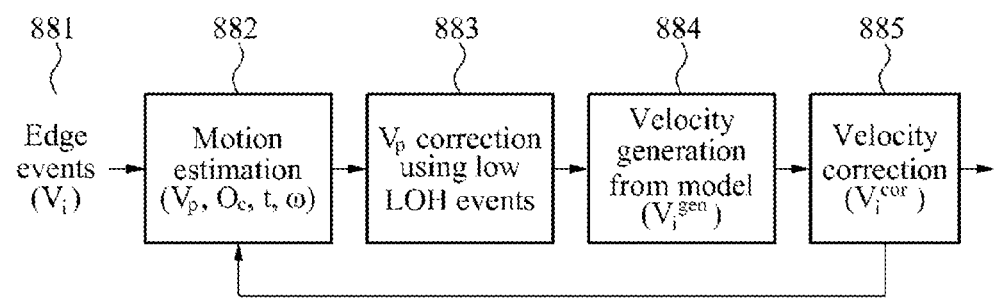

Referring to FIG. 8D, the apparatus for analyzing the image may correct a size of a movement velocity of the object 800, based on Equations 16 and 17. More particularly, in operation 881, the apparatus for analyzing the image may receive $V_i$ as an edge event. The apparatus for analyzing the image may calculate $V_p$, $O_c$, t, and ω, using $V_i$. Detailed descriptions with respect to operations 881 and 882 will be omitted as reference may be made to analogous features described in FIGS. 1 through 7. In operation 883, the apparatus for analyzing the image may calculate $V_p$ through analyzing a motion using an LOH. Similarly, descriptions of FIG. 8A may be applied to operation 883, and therefore a detailed description thereof is omitted.

In operation 884, the apparatus for analyzing the image may calculate $V_i^{gen}$, based on Equation 16. Definitions of parameters used in Equation 16 may be identical to definitions of the parameters used in Equation 7.

$$V_i^{gen} = tP_i + \omega A(P_i - O_c) + V_p \qquad \text{[Equation 16]}$$

In operation 885, the apparatus for analyzing the image may calculate $V_i^{cor}$, based on Equation 17. Here, θ denotes a difference of angles between $V_i$ and $V_i^{gen}$, and may correspond to an angle 855 illustrated in FIG. 8B.

$$V_i^{cor} = \begin{pmatrix} 1 & -\tan\theta \\ \tan\theta & 1 \end{pmatrix} V_i \qquad \text{[Equation 17]}$$

$V_i$ may have a direction differing from a direction of an actual movement, despite having a size similar to a size of a velocity of the actual movement. This is because a velocity of movement is calculated with respect to all edges irrespective of an LOH. Conversely, $V_i^{gen}$ may have a direction identical to a direction of an actual movement, despite having a size less than a size of a velocity of the actual movement. This is because a velocity of movement is calculated with respect to an edge within an observation range of a low LOH. Accordingly, the apparatus for analyzing the image may obtain a size of a vector from $V_i$, and obtain a direction of the vector from $V_i^{gen}$ to calculate $V_i^{cor}$, based on Equation 17.

According to another exemplary embodiment, the apparatus for analyzing the image may iteratively repeat operations 882 through 885. For example, when θ is 90 degrees, calculating $V_i^{cor}$ may be difficult because a value of tan 90° is undefined. In this instance, the apparatus for analyzing the image may iteratively rotate $V_i$ to calculate $V_i^{cor}$. The number of rotations may be two or more. Here, $$\sum_k \theta_k^{Max} \leq \frac{\pi}{2}(k > 1)$$

may need to be satisfied, and $\theta_k^{Max}$ denotes a maximum rotation angle permitted in a k-th iteration.

Figure 9:
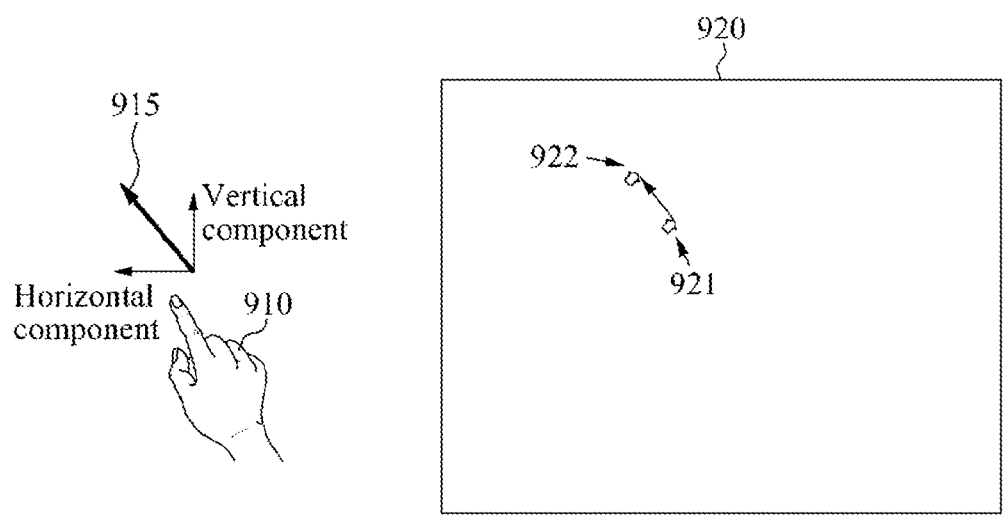
FIG. 9 is a diagram illustrating a scheme for processing a user input based on a movement velocity of an object according to an exemplary embodiment.

FIG. 9 is a diagram illustrating a scheme for processing a user input, based on a movement velocity of an object 910 according to an exemplary embodiment.

Referring to FIG. 9, an apparatus for analyzing an image may process a user input, based on a motion of the object 910. The object 910 may be a user's hand.

The apparatus for analyzing the image may calculate a movement velocity 915 of the object 910, using descriptions provided in the foregoing with respect to FIGS. 1 through 8. The apparatus for analyzing the image may calculate an amount of variation of a relative coordinate of a point for a user input, using the calculated movement velocity 915.

The apparatus for analyzing the image may process the user input, based on the amount of variation of the relative coordinate. For example, the apparatus for analyzing the image may move a position of a cursor marked on a display 920 from an existing position 921 to a new position 922.

Accordingly, the relative coordinate may denote a relative position of an indicator for a user interface (UI), such as a mouse pointer, with reference to a current position of the indicator for UI. The apparatus for processing a user input may calculate an amount of variation of the relative position of the indicator for UI based on a motion of the object. For example, in case that the object is moving to the right at 1 m/s for 1 second, an amount of variation of the relative position of the indicator for UI may be calculated as a vector whose direction is right and magnitude is 1 m.

The apparatus for processing a user input may determine the relative position of the indicator for UI by calculating a new position moved by the amount of variation of the relative position of the indicator for UI, from the current position of the indicator for UI. The apparatus for processing a user input may move the indicator for UI from the current position to the new position.

Although not shown in drawings, the apparatus for analyzing the image may include a recognizer and a processor. The recognizer may recognize a motion of an object, based on an input image including an event signal in which a movement of the object is detected. For example, the recognizer may calculate the movement velocity 915 of the object 910, using the descriptions provided in the foregoing with respect to FIGS. 1 through 8. The processor may update a relative coordinate for a user input, based on the motion of the object recognized by the recognizer. For example, the processor may calculate an amount of variation of the relative coordinate for the user input, using the movement velocity 915 calculated by the recognizer. The processor may update the relative coordinate based on the amount of variation of the relative coordinate, and process the user input using the updated relative coordinate.

Figure 10:
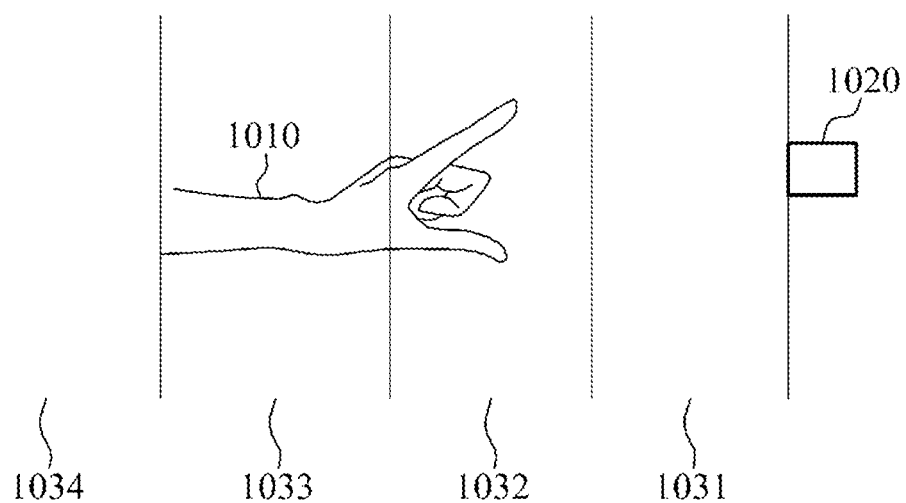
FIG. 10 is a diagram illustrating a scheme for processing a user input based on depth of an object according to an exemplary embodiment.

FIG. 10 is a diagram illustrating a scheme for processing a user input, based on depth of an object according to an exemplary embodiment.

Referring to FIG. 10, an apparatus for analyzing an image may further analyze a depth of an object, using two differing event signals detected at two positions spatially distanced apart from one another with respect to a movement of an identical object. For example, a sensor 1020 may include a first sensor corresponding to a left eye, and a second sensor corresponding to a right eye. The apparatus for analyzing the image may measure the depth to the object, using a disparity between images output from the two sensors corresponding to both eyes.

Referring to FIG. 5, the apparatus for analyzing the image may calculate a disparity of the two images output from the two sensors based on a scheme for maximizing a level of similarity (LOS) of a plurality of patches corresponding to a left eye and a right eye. More particularly, the apparatus for analyzing the image may process both an event signal output from the sensor 1020 corresponding to a left eye and an event signal output from the sensor 1020 corresponding to a right eye. For example, the apparatus for analyzing the image may detect pixels corresponding to an edge through classifying an edge pattern, using the two respective event signals, and determine a direction of the edge in a corresponding pixel, based on the edge pattern of the detected pixels. In this instance, the apparatus for analyzing the image may obtain overlapping images of which two edges of an object are distanced apart from one another. The two edges of the object distanced apart from one another in the two images constitutes the disparity between the two images. The apparatus for analyzing the image may apply an algorithm of Table 5 to the overlapping images of which the two edges of the object are distanced apart from one another.

TABLE 5

$$ILOS(x, y, d) \equiv \frac{1}{\sqrt{M}} \sum_{(x_i, y_i) \in patch@(x,y)} \cos^2\{\theta(x_i, y_i) - \theta(x_i + d, y_i)\}$$

$\theta$: orientation angle, M: number of valid pixels $$rLOS(y, d) \equiv \frac{1}{N_x(d)} \sum_x ILOS(x, y, d) \rightarrow \text{average over x}$$

$$gLOS(d) \equiv \sum_y rLOS(y, d)$$

$$LOS(x, y, d) \equiv ILOS(x, y, d) \times rLOS(y, d) \times gLOS(d)$$

$$disparity(x, y) = \arg\max_d \{LOS(x, y, d)\}$$

Here, (x, y) denotes a coordinate of a patch in an image, and a plurality of points may be included in the patch; $(x_i, y_i)$ denotes a coordinate of an i-th point included in the patch of the (x, y) coordinate, and d denotes a disparity of two images. The two images may be received from a sensor corresponding to a left eye, and a sensor corresponding to a right eye, and therefore, the two images may be distanced apart from one another towards a direction of an x axis in general. Accordingly, d may represent a degree of which the two images are distanced apart from one another in the direction of the x axis. $\theta(x_i, y_i)$ denotes an orientation angle, and may correspond to a direction of an edge calculated at an point of the $(x_i, y_i)$ coordinate.

ILOS(x,y,d) denotes a mathematical formula for determining an LOS in a single patch of the (x, y) coordinate; rLOS(y,d) denotes a mathematical formula for determining an LOS in a one-dimensional (1D) line of a y coordinate; and gLOS(d) denotes a mathematical formula for determining an LOS in a 2D area of an entire image.

The apparatus for analyzing the image may calculate d to maximize LOS(x,y,d). To maximize LOS(x,y,d), a difference between $\theta(x_i, y_i)$ and $\theta(x_i+d, y_i)$ may be minimized, and therefore, the apparatus for analyzing the image may calculate d to minimize the difference between $\theta(x_i, y_i)$ and $\theta(x_i+d, y_i)$.

The apparatus for analyzing the image may estimate a depth of an object to be shallower as a disparity between two images increases, and estimate the depth of the object to be deeper as the disparity between the two images decreases. The apparatus for analyzing the image may process a user input, based on the estimated depth of the object.

The apparatus for analyzing the image may determine, from the sensor 1020, an operation mode corresponding to the depth of the object 1010. For example, a first operation mode area 1031, a second operation mode area 1032, a third operation mode area 1033, and a background area 1034 behind the object 1010 may be predetermined, from the sensor 1020, based on the depth.

The apparatus for analyzing the image may process an input using the object 1010 based on a scheme for processing a user input corresponding to the second operation mode area 1032 when the depth of the object 1010 is determined to correspond to the second operation mode area 1032.

Figure 11:
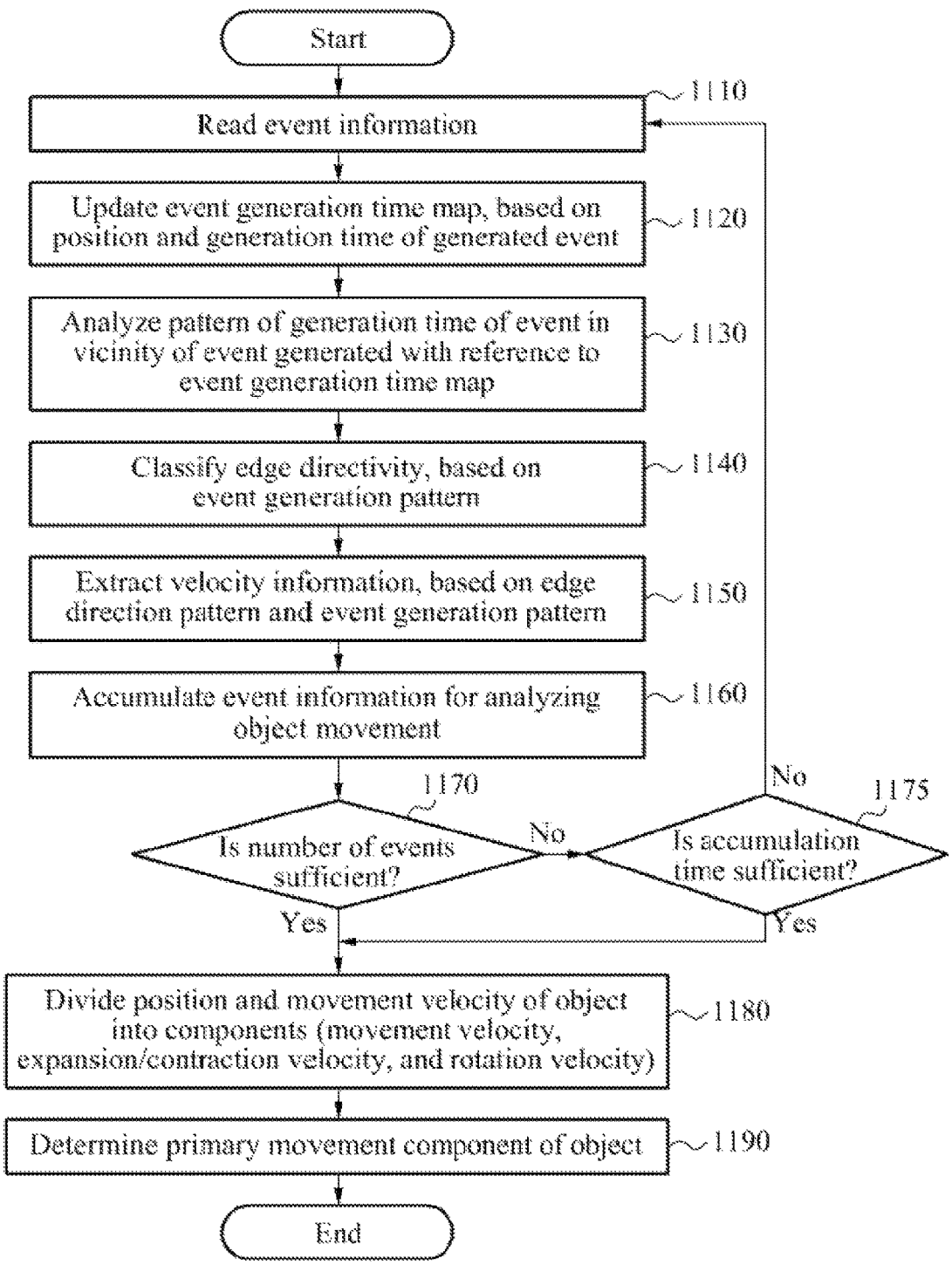
FIG. 11 is a flowchart illustrating a method for analyzing an image according to an exemplary embodiment.

FIG. 11 is a flowchart illustrating a method for analyzing an image according to an exemplary embodiment.

Referring to FIG. 11, in operation 1110, an apparatus for analyzing an image according to an exemplary embodiment may read event information. The apparatus for analyzing the image may update an event generation time map, based on a position and a generation time of an event generated in operation 1120. In operation 1130, the apparatus for analyzing the image may analyze a pattern of a generation time of a neighboring event generated with reference to the event generation time map.

In operation 1140, the apparatus for analyzing the image may classify a directivity of an edge, based on an event generation pattern. In operation 1150, the apparatus for analyzing the image may extract a velocity component, based on an edge direction pattern and the event generation pattern.

In operation 1160, the apparatus for analyzing the image may accumulate event information to analyze a movement of an object. The apparatus for analyzing the image may determine whether a quantity of events accumulated in operation 1170 is sufficient to accurately analyze the movement of the object. When the quantity of events accumulated is determined to be insufficient for analysis of the object movement, as a result of the determination, the apparatus for analyzing the image may determine whether an accumulated time is sufficient to accurately analyze the movement of the object in operation 1175. When the accumulated time is determined to be insufficient for analysis of the object movement, the apparatus for analyzing the image may return to operation 1110, and further accumulate new event information.

When the quantity of accumulated events is sufficient to accurately analyze the movement of the object, or the accumulated time is sufficient to accurately analyze the movement of the object, despite an insufficient number of accumulated events, the apparatus for analyzing the image may divide a position and a movement velocity of an object for a plurality of components in operation 1180. The apparatus for analyzing the image may obtain a movement velocity, expansion or contraction velocity, and a rotation velocity as a movement velocity component.

In operation 1190, the apparatus for analyzing the image may determine a primary movement component of the object. For example, the apparatus for analyzing the image may determine at least one movement component that greatly contributes to movement of the object from among the movement velocity, the expansion or contraction velocity, and the rotation velocity.

Detailed descriptions of FIG. 11 will be omitted as reference may be made to analogous features described with reference to FIGS. 1 through 10.

FIG. 12 is a block diagram illustrating an apparatus 1200 for analyzing a three-dimensional (3D) image according to an exemplary embodiment.

Referring to FIG. 12, the apparatus 1200 for analyzing the 3D image may include at least two image change detectors 1210 and 1215, which include event-based vision sensors 1211 and 1216, respectively, edge direction information extractors 1220 and 1225 for detecting edge direction information for one or more events, velocity information extractors 1230 and 1235 for detecting velocity information for one or more events, and average edge direction information extractors 1240 and 1245 for detecting an average edge direction for pixels for one or more events in a predetermined time.

Also, the apparatus 1200 for analyzing the 3D image may further include a disparity map extractor 1250 for determining the disparity map based on the edge direction information of the edge direction information extractors 1220 and 1225, a distance information mapper 1260 for determining distance information for one or more events, and a 3D position/movement analyzer 1270.

Detailed descriptions of a plurality of modules described in FIG. 12 will be omitted as reference may be made to analogous features described with reference to FIGS. 1 through 11.

The exemplary embodiments illustrated in the FIGS. may be embodied by an apparatus that includes a bus coupled to every unit of the apparatus, at least one processor (e.g., central processing unit, microprocessor, etc.) that is connected to the bus for controlling the operations of the apparatus to implement the above-described functions and executing commands, and a memory connected to the bus to store the commands, received messages, and generated messages.

As will also be understood by the skilled artisan, the exemplary embodiments may be implemented by any combination of software and/or hardware components, such as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

The above-described exemplary embodiments may also be embodied in computer-readable media including program instructions to implement various operations executed by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

A number of exemplary embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for analyzing an image, the apparatus comprising:
a memory configured to store computer-readable instructions; and
a processor configured to execute the computer-readable instructions, which when executed cause the processor to implement:
a classifier configured to receive an event signal corresponding to at least one pixel of an event-based vision sensor in which an event is detected, and configured to determine a pattern of a pixel group of a plurality of pixels of the event-based vision sensor including the at least one pixel and a plurality of adjacent pixels of the event-based vision sensor adjacent to the at least one pixel based on pixel types of the plurality of adjacent pixels, wherein the classifier compares a difference, between a time stamp of a time at which the event is detected by an adjacent pixel included in the pixel group and a time stamp of a time at which the event is detected by the at least one pixel included in the pixel group, with a threshold, and classifies a pixel type of the adjacent pixel included in the pixel group as a predetermined pixel type corresponding to the comparison result, from among a plurality of predetermined pixel types; and
an analyzer configured to determine at least one of an appearance of the object and movement of the object, based on the pattern of the pixel group.

2. The apparatus of claim 1, wherein the event signal indicates an occurrence of the event at a position of the least one pixel by the event-based vision sensor.

3. The apparatus of claim 1, wherein the classifier determines whether the pixel group corresponds to at least one edge pattern among a plurality of predetermined edge patterns.

4. The apparatus of claim 3, wherein the classifier discards the pixel group in response to determining that the pixel group does not correspond to the at least one edge pattern.

5. The apparatus of claim 1, wherein the classifier comprises:
a type determiner configured to determine the pixel types of the plurality of adjacent pixels, based on a difference between the time stamp of the event signal corresponding to the at least one pixel and time stamps of event signals corresponding to the plurality of adjacent pixels; and
a pattern determiner configured to determine a pattern of the pixel group, based on the pixel types of the plurality of adjacent pixels.

6. The apparatus of claim 5, wherein the types of the plurality of adjacent pixels comprise a first pixel type corresponding to a fast event detected by the event-based vision sensor of which a difference between the time stamp of the event signal corresponding to the at least one pixel and the time stamp of an event signal corresponding to the adjacent pixel is less than a first threshold value, a second pixel type corresponding to a slow event detected by the event-based vision sensor of which the difference between the time stamp of the event signal corresponding to at least one pixel and the time stamp of the event signal corresponding to the adjacent pixel is greater than a second threshold value, and a third pixel type corresponding to an agnostic don't-care type of which the difference between the time stamp of the event signal corresponding to at least one pixel and the time stamp of the event signal corresponding to the adjacent pixel is less than the second threshold value and greater than the first threshold value.

7. The apparatus of claim 1, wherein the analyzer comprises:

an appearance analyzer configured to determine a direction of an edge of the object corresponding to the pixel group, based on the pattern of the pixel group.

8. The apparatus of claim 1, wherein the analyzer comprises:
a calculator configured to calculate a velocity corresponding to the pixel group, based on the pattern of the pixel group; and
a motion analyzer configured to analyze the movement of the object, based on the velocity corresponding to the pixel group.

9. The apparatus of claim 8, wherein the movement of the object comprises at least one of a movement velocity component of the object, a rotation velocity component of the object, and a scaling velocity component of the object.

10. The apparatus of claim 8, wherein the analyzer further comprises:
a selector configured to select at least one observation area for analyzing the movement of the object from among a plurality of observation areas, based on a variety of patterns of pixel groups included in an observation area.

11. The apparatus of claim 1, further comprising:
a processor configured to calculate an amount of variation of a relative coordinate of a point for a user input, based on the movement of the object, and process a user input, based on the amount of variation of the relative coordinate.

12. A method for analyzing an image, the method comprising:
receiving, by an apparatus for analyzing an image, an event signal corresponding to at least one pixel of an event-based vision sensor in which an event is detected;
determining, by a processor of the apparatus for analyzing the image, a pattern of a pixel group of a plurality of pixels of the event-based vision sensor including the at least one pixel and a plurality of adjacent pixels of the event-based vision sensor adjacent to the at least one pixel based on pixel types of the plurality of adjacent pixels, wherein the determining comprises comparing a difference, between a time stamp of a time at which the event is detected by an adjacent pixel included in the pixel group and a time stamp of a time at which the event is detected by the at least one pixel included in the pixel group, with a threshold and, classifying a pixel type of the adjacent pixel included in the pixel group as a predetermined pixel type corresponding to the comparison result, from among a plurality of predetermined pixel types; and
determining at least one of an appearance of the object and movement of the object, based on the pattern of the pixel group.

13. The method of claim 12, wherein the event signal indicates an occurrence of the event at a position of the least one pixel by the event-based vision sensor.

14. The method of claim 12, wherein the classifying comprises:
determining the pixel types of the plurality of adjacent pixels, based on a difference between the time stamp of the at least one pixel and time stamps of the plurality of adjacent pixels;
determining whether the pixel group corresponds to at least one edge pattern among a plurality of predetermined edge patterns, based on the types of the plurality of adjacent pixels; and
discarding the pixel group in response to determining that the pixel group does not correspond to the at least one edge pattern and determining a pattern of the pixel group to be the at least one edge pattern in response to determining that the pixel group corresponds to the at least one edge pattern.

15. The method of claim 12, wherein the determining the least one of the appearance of the object and the movement of the object comprises determining a direction of an edge corresponding to the pixel group, based on the pattern of the pixel group.

16. The method of claim 12, wherein the determining the least one of the appearance of the object and the movement of the object comprises:
selecting at least one observation area for analyzing movement of the object, from among a plurality of observation areas, based on a variety of patterns of pixel groups to be included in an observation area;
calculating velocities corresponding to a plurality of pixel groups included in the at least one observation area; and
analyzing movement of the object, based on the velocities corresponding to the plurality of pixel groups.

17. The method of claim 12, further comprising:
calculating an amount of variation of a relative coordinate of a point for a user input, based on a movement velocity of the object included in movement of the object; and
processing a user input, based on the amount of variation of the relative coordinate.

* * * * *